(12) United States Patent
Matsuzaki et al.

(10) Patent No.: US 8,837,264 B2
(45) Date of Patent: Sep. 16, 2014

(54) OPTICAL INFORMATION DEVICE, OPTICAL DISC DRIVING DEVICE, OPTICAL INFORMATION RECORDING DEVICE, OPTICAL INFORMATION REPRODUCING DEVICE, GAP CONTROL METHOD, AND OPTICAL PICKUP

(75) Inventors: Keiichi Matsuzaki, Kyoto (JP); Kousei Sano, Osaka (JP); Hidenori Wada, Kyoto (JP); Tatsuya Takaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/005,376

(22) PCT Filed: Apr. 11, 2012

(86) PCT No.: PCT/JP2012/002501
§ 371 (c)(1),
(2), (4) Date: Sep. 16, 2013

(87) PCT Pub. No.: WO2012/140876
PCT Pub. Date: Oct. 18, 2012

(65) Prior Publication Data
US 2014/0010058 A1   Jan. 9, 2014

(30) Foreign Application Priority Data

Apr. 14, 2011 (JP) ................. 2011-089874

(51) Int. Cl.
| | |
|---|---|
| G11B 20/18 | (2006.01) |
| G11B 27/36 | (2006.01) |
| G11B 7/1367 | (2012.01) |
| G11B 7/09 | (2006.01) |
| G11B 7/1353 | (2012.01) |
| G11B 7/1374 | (2012.01) |
| G11B 7/1372 | (2012.01) |
| B82Y 20/00 | (2011.01) |

(52) U.S. Cl.
CPC .............. *G11B 27/36* (2013.01); *G11B 7/1367* (2013.01); *G11B 2007/13727* (2013.01); *G11B 7/0908* (2013.01); *G11B 7/1353* (2013.01); *B82Y 20/00* (2013.01); *G11B 7/1374* (2013.01)
USPC ....................................... 369/53.12

(58) Field of Classification Search
None
See application file for complete search history.

(56) References Cited

U.S. PATENT DOCUMENTS 6,717,896 B1 *  4/2004  Imanishi ..................... 369/53.27
6,845,066 B1 *  1/2005  Shingo ....................... 369/44.23
(Continued)

FOREIGN PATENT DOCUMENTS

| JP | 2002-8235 | 1/2002 |
|---|---|---|
| JP | 2005-182895 | 7/2005 |

(Continued)

OTHER PUBLICATIONS

International Search Report issued Jul. 17, 2012 in International (PCT) Application No. PCT/JP2012/002501.

*Primary Examiner* — Brenda Bernardi
(74) *Attorney, Agent, or Firm* — Wenderoth, Lind & Ponack, L.L.P.

(57) ABSTRACT

An optical information device is provided with a first scattering medium (9), a second scattering medium (10), a third scattering medium (11); a diffraction element (4) which generates a plurality of light beams; an objective lens (6) which guides, to the first scattering medium (9) and to the third scattering medium (11) out of the first scattering medium (9), the second scattering medium (10), and the third scattering medium (11), two light beams out of the plurality of the light beams; and an arithmetic circuit (17) which detects a gap interval between the first scattering medium (9) and the third scattering medium (11), and an information medium (12), based on a change in an amount of reflected light from the first scattering medium (9) and from the third scattering medium (11).

25 Claims, 14 Drawing Sheets

(56) References Cited

U.S. PATENT DOCUMENTS

| | | | |
|---|---|---|---|
| 7,002,886 B2 * | 2/2006 | Chu et al. | 369/53.19 |
| 7,406,016 B2 * | 7/2008 | Ishimoto | 369/53.28 |
| 7,944,799 B2 * | 5/2011 | Futakuchi et al. | 369/112.24 |
| 2005/0259530 A1 | 11/2005 | Ishimoto et al. | |
| 2006/0023577 A1 | 2/2006 | Shinoda et al. | |

FOREIGN PATENT DOCUMENTS

| | | |
|---|---|---|
| JP | 2006-4596 | 1/2006 |
| JP | 2006-12301 | 1/2006 |
| JP | 2006-99902 | 4/2006 |

* cited by examiner

OPTICAL INFORMATION DEVICE, OPTICAL DISC DRIVING DEVICE, OPTICAL INFORMATION RECORDING DEVICE, OPTICAL INFORMATION REPRODUCING DEVICE, GAP CONTROL METHOD, AND OPTICAL PICKUP

TECHNICAL FIELD

The present invention relates to an optical information device, an optical disc driving device, an optical information recording device, an optical information reproducing device, a gap control method, and an optical pickup which are configured to record information on an information medium or reproduce information recorded on an information medium, with use of plasmon and at a resolution exceeding the diffraction limit of light.

BACKGROUND ART

A plasmon is a vibrational quantum of free electrons in metal or like substance. It is possible to vibrate free electrons in metal as a group, and to excite plasmon by irradiating light onto a nano-scale structure of metal (metal nano-structure).

It is possible to obtain a locally enhanced electromagnetic field by exciting plasmon. In view of the above, various applications utilizing plasmon energy have been expected.

As one of the application examples, there is proposed a technology, in which local plasmon is excited by incidence of light onto a metal nano-structure, the optical electric field near the metal nano-structure is locally enhanced, and information is recorded in a very small area in the order of nanometers exceeding the diffraction limit, with use of the enhanced optical electric field, for the purpose of implementing super high density information recording or reproduction by light (see patent literature 1, for instance).

FIG. 20 is a diagram showing a configuration of a conventional optical pickup for use in recording or reproducing information to or from an information medium with use of plasmon, which is disclosed in patent literature 1.

Referring to FIG. 20, laser light 101 emitted from a laser light source 100 is converged through a lens 102, and is collected on a metal nano-structure 104 formed on a surface of a substrate 103 made of a material capable of transmitting the laser light 101, from the back side of the substrate 103.

The metal nano-structure 104 is embedded in the substrate 103 so as not to obstruct the movement of the substrate 103 relative to a recording medium 105. In patent literature 1, a columnar-shaped hole of about 50 nm in diameter and about 100 nm in depth is formed in the substrate 103, and the metal nano-structure 104 made of gold is embedded in the hole.

The lens 102 is finely movable upward and downward, and leftward and rightward with respect to the substrate 103 by an unillustrated mechanism. The position of the lens 102 is adjusted and fixed so that the middle part of the focal point of the lens 102 is aligned with the metal nano-structure 104.

When the laser light 101 is entered to the lens 102, local plasmon is excited by the metal nano-structure 104, and the optical electric field near the metal nano-structure 104 is enhanced.

The metal nano-structure 104 disclosed in patent literature 1 has a columnar shape, and the bottom surface of the metal nano-structure 104 lies in a flat plane of the substrate 103 facing a surface of the recording medium 105. Accordingly, the spread of the enhanced optical electric field generally corresponds to the diameter of the bottom surface of the metal nano-structure 104, namely, about 50 nm.

Loading an optical pickup in a recording or reproducing device having a function of controlling the distance between the metal nano-structure 104 and the recording medium 105, and bringing the metal nano-structure 104 in proximity to the recording medium 105 by a predetermined distance makes it possible to record information with a spot diameter generally corresponding to the spread of the enhanced optical electric field.

In reproducing recorded information, incident light of an intensity weaker than the intensity of incident light used at the time of recording is used, and a signal representing light reflected from or transmitted through the metal nano-structure 104 is detected.

The threshold value for signal detection is set in a range between a signal intensity representing light from a plasmon-enhanced optical electric field, and a signal intensity representing light collected through the lens 102 at a position other than the optical electric field so that a signal other than the signal representing the light from the plasmon-enhanced optical electric field is not detected. According to the above configuration, it is possible to reproduce the information written in a very small area equal to or smaller than the diffraction limit.

In the conventional configuration shown in FIG. 20, the plasmon-enhanced optical electric field drastically decreases exponentially, as the optical electric field is distanced away from the metal nano-structure 104. In view of the above, it is necessary to minimize the distance between the optical pickup and the recording medium 105 i.e. the operating distance in the order of several nanometers, for instance, in order to allow the optical electric field to reach the recording medium 105 for information recording or reproduction.

Further, it is necessary to keep the operating distance to a constant value with extremely high precision in the order of sub-nanometers. In the case where it is insufficient to keep the operating distance to a constant value, as the operating distance varies, the intensity of a laser beam to be irradiated onto a signal plane of the recording medium 105 may greatly vary. This may deteriorate the recording precision or the reproduction precision.

As a configuration for reducing the operating distance, there is proposed a configuration substantially equivalent to a magnetic head in a conventional hard disk device, for instance. Specifically, there is proposed an idea of lifting a light collecting optical system for generating plasmon light, which is attached to a tip end of a swing arm, above a recording medium, using an airstream generated by rotating the recording medium.

According to the above configuration, however, the strength of airstream depends on a linear velocity of a recording medium. Accordingly, a slight fluctuation of the linear velocity of a recording medium may vary the operating distance in the order of nanometers or in the order of sub-nanometers. This may resultantly vary the recording light amount or the reproduction light amount.

Further, the operating distance may vary due to a temperature change or due to an external disturbance. In view of the above, it is necessary to devise a novel approach for detecting an operating distance for feedback control in order to keep the operating distance constantly with ultra-high precision.

CITATION LIST

Patent Literature

Patent literature 1: Japanese Patent No. 3,826,684

SUMMARY OF INVENTION

In view of the above, an object of the invention is to provide an optical information device, an optical disc driving device, an optical information recording device, an optical information reproducing device, a gap control method, and optical pickup that enable to detect a gap interval between a scattering medium and an information medium with high precision, and enable to stably record or reproduce information to or from the information medium with high precision.

An optical information device according to an aspect of the invention is provided with a plurality of scattering media; a light beam generating section which generates a plurality of light beams; a light guiding section which guides, to at least two scattering media out of the plurality of the scattering media, at least two light beams out of the plurality of the light beams; and a detecting section which detects a gap interval between the at least two scattering media and an information medium, based on a change in an amount of reflected light from the at least two scattering media.

According to the above configuration, the light beam generating section generates a plurality of light beams. The light guiding section guides, to at least two scattering media out of a plurality of the scattering media, at least two light beams out of the plurality of the light beams. The detecting section detects a gap interval between the at least two scattering media and an information medium, based on a change in an amount of reflected light from the at least two scattering media.

According to the invention, a gap interval between the at least two scattering media and the information medium is detected, based on a change in an amount of reflected light from the at least two scattering media. In the above configuration, it is possible to detect a gap interval between the at least two scattering media and the information medium with high precision, and to stably record or reproduce information to or from the information medium with high precision.

These and other objects, features and advantages of the present invention will become more apparent upon reading the following detailed description along with the accompanying drawings.

DESCRIPTION OF EMBODIMENTS

In the following, embodiments of the invention are described referring to the accompanying drawings. The following embodiments are merely examples embodying the invention, and do not limit the technical range of the invention.

First Embodiment

Figure 1:
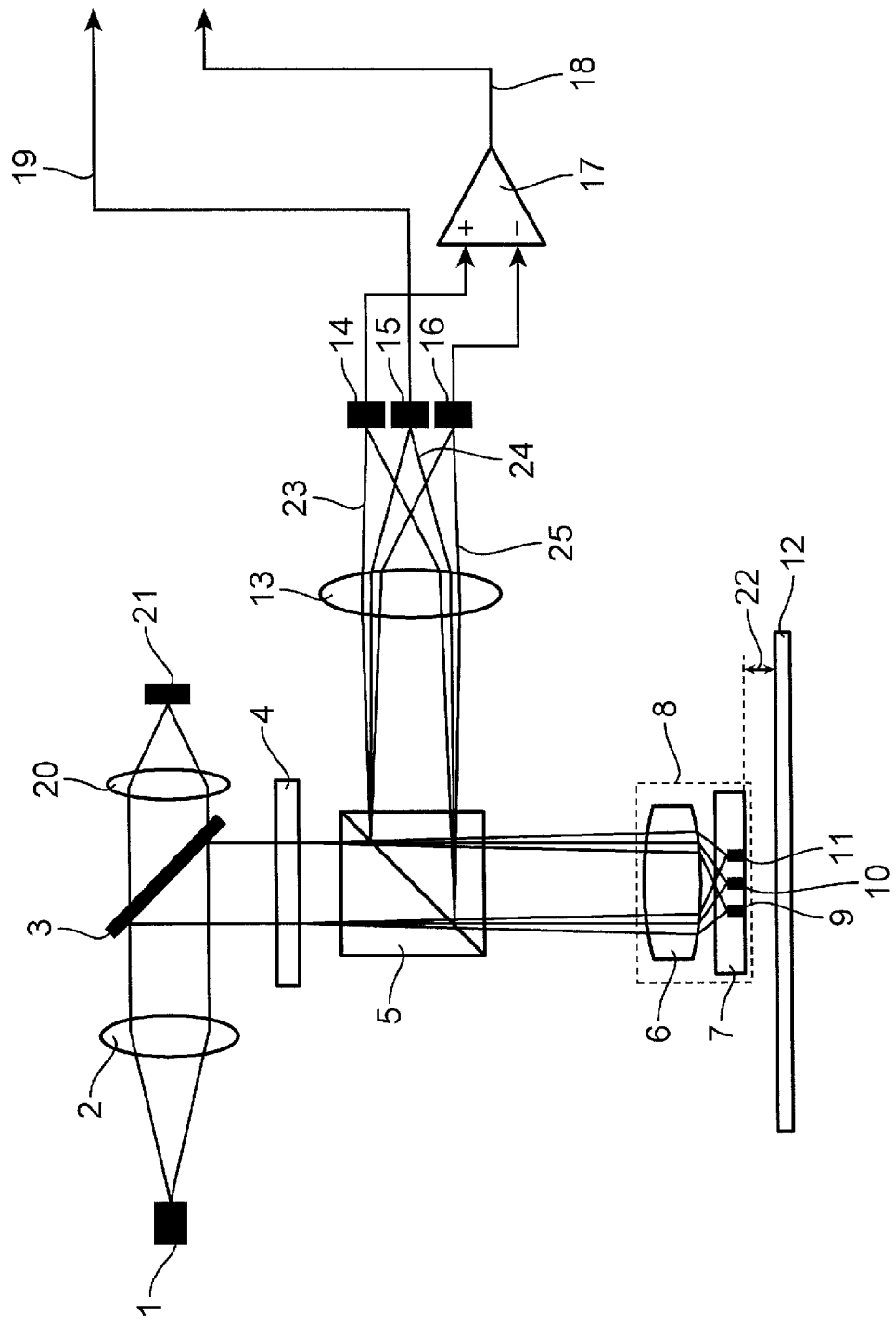
FIG. 1 is a diagram showing a configuration of an optical information device according to a first embodiment of the invention.

FIG. 1 is a diagram showing a configuration of an optical information device according to the first embodiment of the invention. The optical information device shown in FIG. 1 is provided with a laser light source 1, a collimator lens 2, a mirror 3, a diffraction element 4, a beam splitter 5, an objective lens unit 8, a detection lens 13, a first light detecting element 14, a second light detecting element 15, a third light detecting element 16, an arithmetic circuit 17, a light collecting lens 20, and a fourth light detecting element 21. The objective lens unit 8 is provided with an objective lens 6 and a substrate 7. The substrate 7 is provided with a first scattering medium 9, a second scattering medium 10, and a third scattering medium 11. It should be noted that an optical pickup is provided with the aforementioned configuration except for the arithmetic circuit 17.

Referring to FIG. 1, laser light emitted from the laser light source 1 is converted into parallel light by the collimator lens 2, and is bent in a direction toward the objective lens unit 8 by the mirror 3.

Laser light reflected on the mirror 3 is separated into light beams (three light beams) as diffraction light by the diffraction element 4. The light beams (three light beams) are transmitted through the beam splitter 5, and collected on the first scattering medium 9, the second scattering medium 10, and the third scattering medium 11 formed on a surface of the substrate 7 by the objective lens 6.

As a material for the first scattering medium 9, the second scattering medium 10, and the third scattering medium 11, it is possible to use a metal material such as gold, silver, platinum, aluminum, or chrome; or diamond-like carbon (DLC); or carbon nanotube. Preferably, the first scattering medium 9, the second scattering medium 10, and the third scattering medium 11 may be embedded in the substrate 7 in order to prevent peel-off or damage of the first scattering medium 9, the second scattering medium 10, and the third scattering medium 11 in contact thereof with an information medium 12, and to avoid obstruction thereof with the information medium 12 while moving on the information medium 12.

When laser light is irradiated onto the first scattering medium 9, the second scattering medium 10, and the third scattering medium 11, local plasmon is excited on each of the scattering media, and the optical electric field intensity near each of the scattering media is enhanced. Specifically, the first scattering medium 9, the second scattering medium 10, and the third scattering medium 11 respectively generate plasmon light by irradiation of a light beam thereto.

For instance, in the case where the scattering medium has a columnar shape with a diameter of about 50 nm, the spread of the enhanced optical electric field generally corresponds to the diameter of a bottom surface of the scattering medium i.e. about 50 nm.

Bringing the scattering medium in proximity to the information medium 12 by a predetermined distance makes it possible to record information with a spot diameter generally corresponding to the spread of the optical electric field.

In this embodiment, for instance, the diffraction efficiency of the diffraction element 4 is set in such a manner that the amount of light to be irradiated onto the second scattering medium 10 is larger than the amount of light to be irradiated onto the first scattering medium 9 and onto the third scattering medium 11. Information is recorded by scattered light from the second scattering medium 10, and a gap interval between a scattering medium and the information medium 12 is detected by detecting reflected light from the first scattering medium 9 and from the third scattering medium 11.

Plasmon light generated on the second scattering medium 10 is set to a light amount capable of recording information on the information medium 12, and plasmon light generated on the first scattering medium 9 and on the third scattering medium 11 for gap detection is set to a light amount incapable of recording information on the information medium 12 at the time of gap detection. The details of gap detection will be described later.

At the time of reproduction, incident light of an intensity smaller than the intensity of incident light used at the time of recording is used, and light reflected from or transmitted through the second scattering medium 10 is detected. According to this configuration, it is possible to reproduce information written in a very small area equal to or smaller than the diffraction limit.

Reflected light from the first scattering medium 9, the second scattering medium 10, and the third scattering medium 11 is reflected on the beam splitter 5, and is respectively collected on the first light detecting element 14, the second light detecting element 15, and the third light detecting element 16 through the detection lens 13.

The second light detecting element 15 receives reflected light from the second scattering medium 10, and converts the received light into an electrical signal according to the amount of reflected light. The electrical signal from the second light detecting element 15 is sent to an unillustrated signal processor as a reproduction signal 19. The signal processor outputs a signal recorded on the information medium 12 as a digital signal.

Further, the first light detecting element 14 and the third light detecting element 16 receive reflected light from the first scattering medium 9 and from the third scattering medium 11, and convert the respective received light into electrical signals according to the amounts of reflected light. The electrical signals from the first light detecting element 14 and from the third light detecting element 16 are converted into a gap error signal 18 by the arithmetic circuit 17.

In this way, the laser light source 1 and the diffraction element 4 generate light beams. The objective lens 6 guides two light beams out of the light beams to the first scattering medium 9 and to the third scattering medium 11. The arithmetic circuit 17 detects a gap interval between the first scattering medium 9 and the third scattering medium 11, and the information medium 12, based on a change in an amount of reflected light from the first scattering medium 9 and from the third scattering medium 11. The laser light source 1 emits a light beam. The diffraction element 4 splits the light beam from the laser light source 1 into light beams. The objective lens 6 converges the light beams split by the diffraction element 4.

Further, the first light detecting element 14 and the third light detecting element 16 respectively receive reflected light from the first scattering medium 9 and from the third scattering medium 11, and respectively output electrical signals in proportion to amounts of the received light. The arithmetic circuit 17 detects a gap interval, based on a difference between the electrical signals output from the first light detecting element 14 and from the third light detecting element 16.

Further, the objective lens 6 guides one light beam other than the two light beams out of the light beams to the second scattering medium 10. Information is recorded on the information medium 12 or information is reproduced from the information medium 12 with use of an optical electric field generated on the second scattering medium 10.

Figure 2:
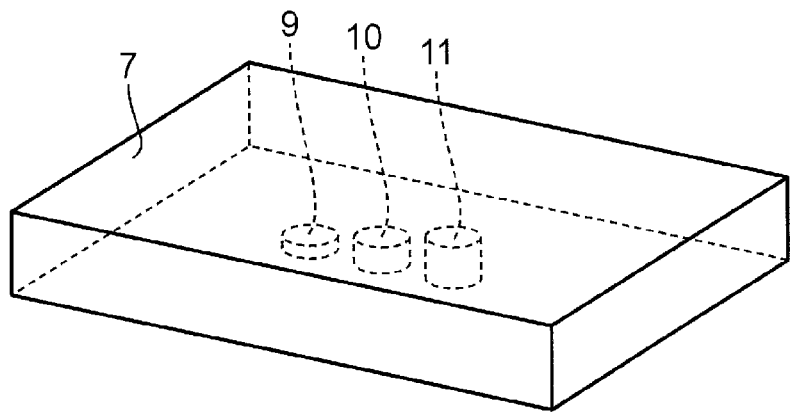
FIG. 2 is a diagram showing a configuration of a substrate in the first embodiment of the invention.

FIG. 2 is a diagram showing a configuration of the substrate 7 in the first embodiment of the invention. As shown in FIG. 2, the substrate 7 is provided with the first scattering medium 9, the second scattering medium 10, and the third scattering medium 11. The first scattering medium 9 and the third scattering medium 11 are disposed to be adjacent to the second scattering medium 10. The shapes of the first scattering medium 9, the second scattering medium 10, and the third scattering medium 11 differ from each other. In this embodiment, the shapes of the first scattering medium 9, the second scattering medium 10, and the third scattering medium 11 are a columnar shape. The sizes of the bottom surfaces of the first scattering medium 9, the second scattering medium 10, and the third scattering medium 11 are the same as each other, but the height of the second scattering medium 10 is higher than the height of the first scattering medium 9, and the height of the third scattering medium 11 is higher than the height of the second scattering medium 10.

The substrate 7 has a flat portion on a surface thereof facing the incident surface of the information medium 12. The first scattering medium 9, the second scattering medium 10, and the third scattering medium 11 are embedded in the substrate 7 in such a manner as not to protrude from the flat portion of the substrate 7.

In this embodiment, the first scattering medium 9, the second scattering medium 10, and the third scattering medium 11 correspond to an example of a plurality of scattering media, the laser light source 1 and the diffraction element 4 correspond to an example of a light beam generating section, the objective lens 6 corresponds to an example of a light guiding section, the arithmetic circuit 17 corresponds to an example of a detecting section, the first scattering medium 9 and the third scattering medium 11 correspond to an example of at least two scattering media, the first light detecting element 14 and the third light detecting element 16 correspond to an example of two light receiving elements, the second scattering medium 10 corresponds to an example of at least one scattering medium, the substrate 7 corresponds to an example of a flat substrate, the laser light source 1 corresponds to an example of a light source, the diffraction element 4 corresponds to an example of an optical element, and the objective lens 6 corresponds to an example of an objective lens.

In the following, gap detection is described in details referring to FIG. 1 and FIG. 2.

Plasmon light on a scattering medium is strongly generated only in the case where a specific condition is satisfied. Referring to FIG. 1, the parameters satisfying the specific condition include a wavelength of laser light, a polarized state of laser light, a structure of a scattering medium, a complex refractive index of a scattering medium, a refractive index of a substrate on which a scattering medium is formed, a refractive index of an information medium, and a gap interval between an information medium and a scattering medium.

Among the above parameters, only the gap interval between an information medium and a scattering medium is set to a variable value, and the parameters other than the gap interval are set to a constant value. Specifically, the structure of each of the scattering media is determined in such a manner that the first scattering medium 9, the second scattering medium 10, and the third scattering medium 11 respectively generate plasmon light most strongly when the gap interval between the first scattering medium 9 and the information medium is set to a gap interval "a", the gap interval between the second scattering medium 10 and the information medium is set to a gap interval "b", and the gap interval between the third scattering medium 11 and the information medium is set to a gap interval "c".

As shown in FIG. 2, for instance, in the case where the shapes of the first scattering medium 9, the second scattering medium 10, and the third scattering medium 11 are a columnar shape, it is possible to determine the shapes of the first scattering medium 9, the second scattering medium 10, and the third scattering medium 11 capable of generating plasmon light most strongly when the gap intervals of the first scattering medium 9, the second scattering medium 10, and the third scattering medium 11 are respectively set to the gap interval "a", the gap interval "b", and the gap interval "c", which are different from each other, by changing the ratio between the radius and the height of each of the scattering media.

In this embodiment, the shapes of the first scattering medium 9, the second scattering medium 10, and the third scattering medium 11 are a columnar shape, but the shapes are not specifically limited to the above in the invention.

For instance, the shapes of the first scattering medium 9, the second scattering medium 10, and the third scattering medium 11 may be a triangular prismatic shape. In the case where the shapes of the first scattering medium 9, the second scattering medium 10, and the third scattering medium 11 are a triangular prismatic shape, it is possible to determine the shapes of the first scattering medium 9, the second scattering medium 10, and the third scattering medium 11 by changing the length and the thickness of each of the scattering media having a triangular prismatic shape.

Further, the shapes of the first scattering medium 9, the second scattering medium 10, and the third scattering medium 11 may be a spheroidal shape. In the case where the shapes of the first scattering medium 9, the second scattering medium 10, and the third scattering medium 11 are a spheroidal shape, the shapes of the first scattering medium 9, the second scattering medium 10, and the third scattering medium 11 are determined by changing the ratio between a vertical size and a transverse size of each of the scattering media having a spheroidal shape.

Further, the shapes of the first scattering medium 9, the second scattering medium 10, and the third scattering medium 11 may be the same as each other, and the scattering media may be respectively made of materials having complex refractive indexes different from each other.

Further, the substrate 7 has a flat portion on a surface thereof facing the incident surface of the information medium 12. The first scattering medium 9, the second scattering medium 10, and the third scattering medium 11 may be formed on the surface of the flat portion of the substrate 7. In the above modification, preferably, the first scattering medium 9, the second scattering medium 10, and the third scattering medium 11 may be a film having a triangular shape.

Figure 3:
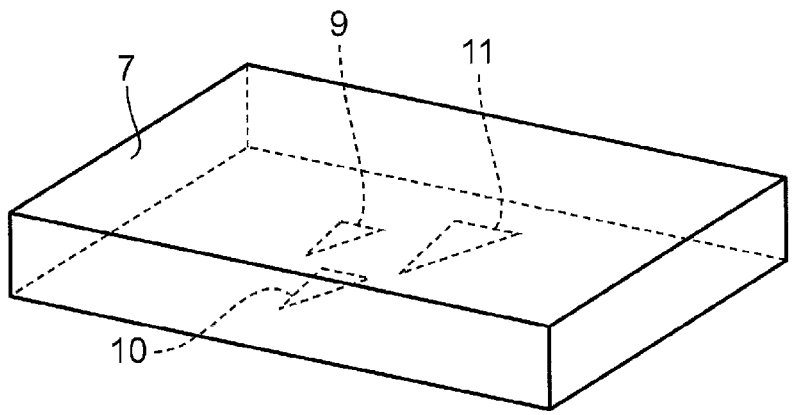
FIG. 3 is a diagram showing another configuration of a first scattering medium, a second scattering medium, and a third scattering medium in the first embodiment of the invention.

FIG. 3 is a diagram showing another configuration of the first scattering medium 9, the second scattering medium 10, and the third scattering medium 11 in the first embodiment of the invention.

As shown in FIG. 3, the first scattering medium 9, the second scattering medium 10, and the third scattering medium 11 may be made of a film having a triangular shape. The sizes of the first scattering medium 9, the second scattering medium 10, and the third scattering medium 11 shown in FIG. 3 are different from each other. Alternatively, the sizes of the first scattering medium 9, the second scattering medium 10, and the third scattering medium 11 may be the same as each other, and the first scattering medium 9, the second scattering medium 10, and the third scattering medium 11 may be made of materials different from each other.

Figure 4:
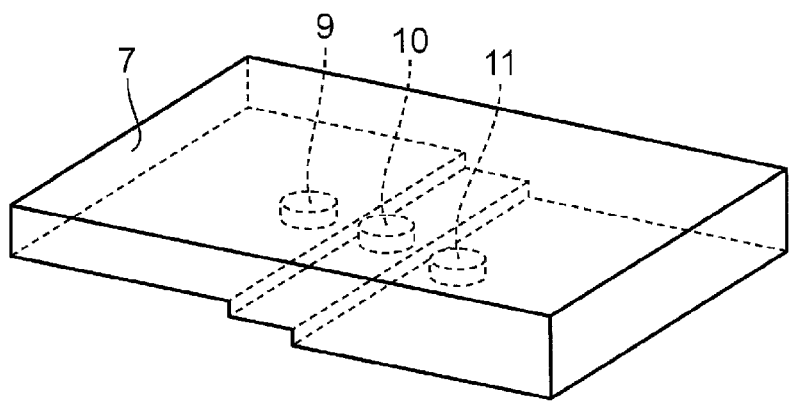
FIG. 4 is a diagram showing still another configuration of the first scattering medium, the second scattering medium, and the third scattering medium in the first embodiment of the invention.

FIG. 4 is a diagram showing still another configuration of the first scattering medium 9, the second scattering medium 10, and the third scattering medium 11 in the first embodiment of the invention.

As shown in FIG. 4, the shapes of the first scattering medium 9, the second scattering medium 10, and the third scattering medium 11 may be the same as each other, and the substrate 7 may have step portions on the surface thereof facing the incident surface of the information medium 12.

Referring to FIG. 4, the substrate 7 has three surfaces facing the incident surface of the information medium 12, and whose distances from the incident surface of the information medium 12 differ from each other. The distance from the surface of the substrate 7 on which the second scattering medium 10 is disposed to the incident surface of the information medium 12 is set shorter than the distance from the surface of the substrate 7 on which the first scattering medium 9 is disposed to the incident surface of the information medium 12; and the distance from the surface of the substrate 7 on which the third scattering medium 11 is disposed to the incident surface of the information medium 12 is set shorter than the distance from the surface of the substrate 7 on which the second scattering medium 10 is disposed to the incident surface of the information medium 12.

In other words, the shapes of the first scattering medium 9, the second scattering medium 10, and the third scattering medium 11 may be the same as each other, and the respective distances from the first scattering medium 9, the second scattering medium 10, and the third scattering medium 11 to the incident surface of the information medium 12 may differ from each other.

Figure 5:
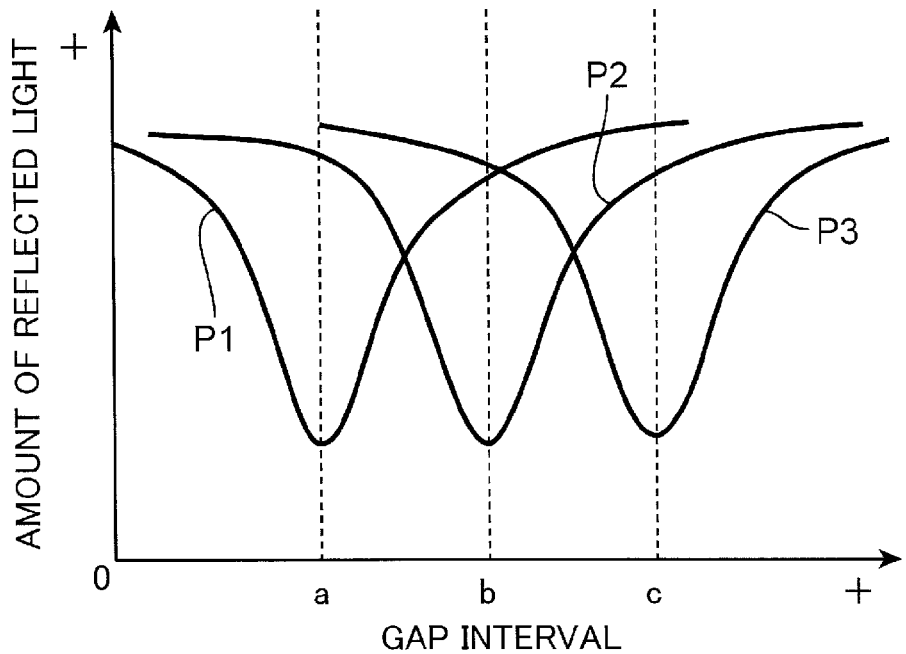
FIG. 5 is a graph showing a relationship between a gap interval between each of the scattering media and an information medium, and an amount of reflected light from each of the scattering media in the first embodiment.

In the thus configured structure of the scattering media, a gap interval 22 shown in FIG. 1, and an amount of reflected light from a scattering medium have a relationship as shown in the graph of FIG. 5. FIG. 5 is a graph showing a relationship between a gap interval between each of the scattering media and an information medium, and an amount of reflected light from each of the scattering media in the first embodiment. Referring to FIG. 5, the horizontal axis represents a gap interval between each of the scattering media and an information medium, and the vertical axis represents an amount of reflected light from each of the scattering media. In this example, the curve P1, the curve P2, and the curve P3 in FIG. 5 respectively indicate the amount of first reflected light 23 from the first scattering medium 9, the amount of second reflected light 24 from the second scattering medium 10, and the amount of third reflected light 25 from the third scattering medium 11.

Referring to FIG. 5, plasmon resonance occurs on the first scattering medium 9, the second scattering medium 10, and the third scattering medium 11, and plasmon light is strongly generated, in the case where the gap interval between the first scattering medium 9 and the information medium 12 is equal to the gap interval "a", the gap interval between the second scattering medium 10 and the information medium 12 is equal to the gap interval "b", and the gap interval between the third scattering medium 11 and the information medium 12 is equal to the gap interval "c". Accordingly, as shown by the curves P1, P2, and P3, contrary to an increase in plasmon light as described the above, the amount of reflected light from each of the scattering media decreases, and the amount of reflected light is set to a minimum value at each of the gap interval "a", the gap interval "b", and the gap interval "c".

In this way, the amounts of reflected light from the first scattering medium 9 and from the third scattering medium 11 are minimized at two gap intervals different from each other. The amount of reflected light from the second scattering medium 10 is minimized at two gap intervals at which a difference between electrical signals output from the first light detecting element 14 and from the third light detecting element 16 is minimized.

Further, the amount of reflected light from the first scattering medium 9 out of the first scattering medium 9 and the third scattering medium 11 is minimized at the first gap interval "a". The amount of reflected light from the third scattering medium 11 out of the first scattering medium 9 and the third scattering medium 11 is minimized at the second gap interval "c" larger than the first gap interval "a". The third gap interval "b", which is a gap interval between the second scattering medium 10 and the information medium 12 for use in record-ing or reproducing information, is not smaller than the first gap interval "a" but not larger than the second gap interval "c".

A gap detection signal (gap error signal) in proportion to a gap interval can be obtained by calculating a difference between an electrical signal obtained by conversion from the first reflected light 23 on the first scattering medium 9, and an electrical signal obtained by conversion from the third reflected light 25 on the third scattering medium 11, as shown in FIG. 1.

Figure 6:
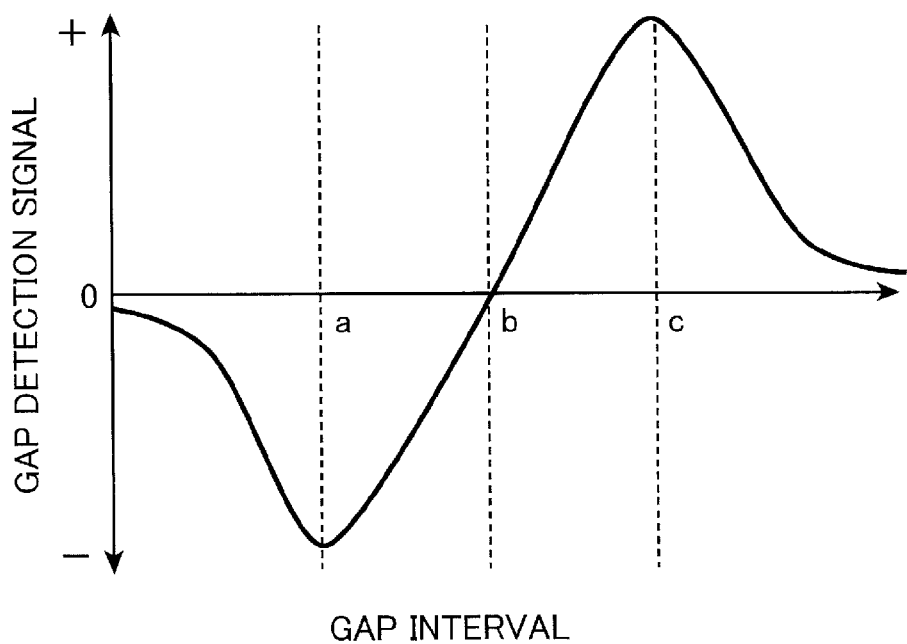
FIG. 6 is a graph showing a relationship between a gap interval, and a gap detection signal in the first embodiment.

FIG. 6 is a graph showing a relationship between a gap interval and a gap detection signal in the first embodiment. As shown in FIG. 6, a gap detection signal has an S-shaped curve with respect to a gap interval. Accordingly, as shown in FIG. 6, in the case where a detected gap interval "g" is smaller than the gap interval "b" in the range from the gap interval "a" to the gap interval "c" (a<g<b), feedback control is performed in such a manner as to widen the gap interval "g". Further, in the case where the detected gap interval "g" is larger than the gap interval "b" (b<g<c), feedback control is performed in such a manner as to narrow the gap interval "g". By performing the above operation, the gap interval "g" is adjusted to be equal to the gap interval "b", which is optimum for recording or reproducing information.

In the case where the gap interval "g" is adjusted to be equal to the gap interval "b", plasmon light is generated on the second scattering medium 10. Accordingly, it is possible to record or reproduce information to or from the information medium 12 with use of the second scattering medium 10.

In the case where information is recorded, intensity modulation is performed with respect to laser light. This may vary the amplitude of a gap error signal. In view of the above, as shown in FIG. 1, light transmitted through the minor 3 and collected on the light collecting lens 20 is received on the fourth light detecting element 21, and a gap error signal from the arithmetic circuit 17 is normalized by an unillustrated normalization circuit, with use of an electrical signal output from the fourth light detecting element 21. According to the above configuration, it is possible to cancel out an amplitude variation of a gap error signal. The above configuration is advantageous in obtaining a stable gap error signal.

In the embodiment shown in FIG. 1, plasmon light is obtained by collecting laser light on the scattering media formed on the surface of the substrate 7 by the objective lens 6, which serves as a light collecting optical system for collecting light. The above technique can be implemented by a configuration other than the above.

Figure 7:
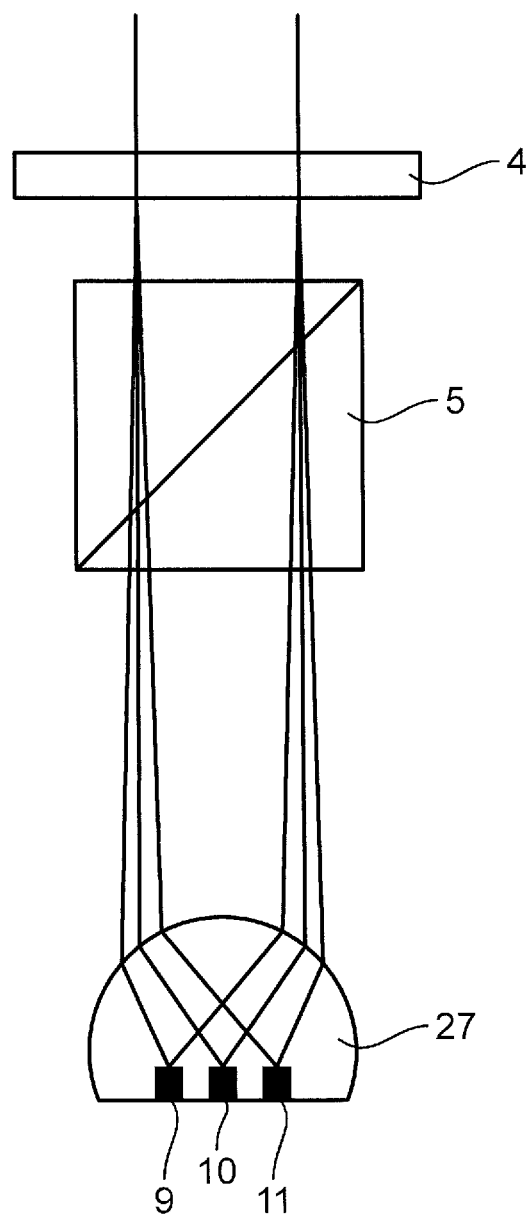
FIG. 7 is a diagram showing a configuration of an objective lens having a super hemispherical shape in the first embodiment of the invention.
Figure 8:
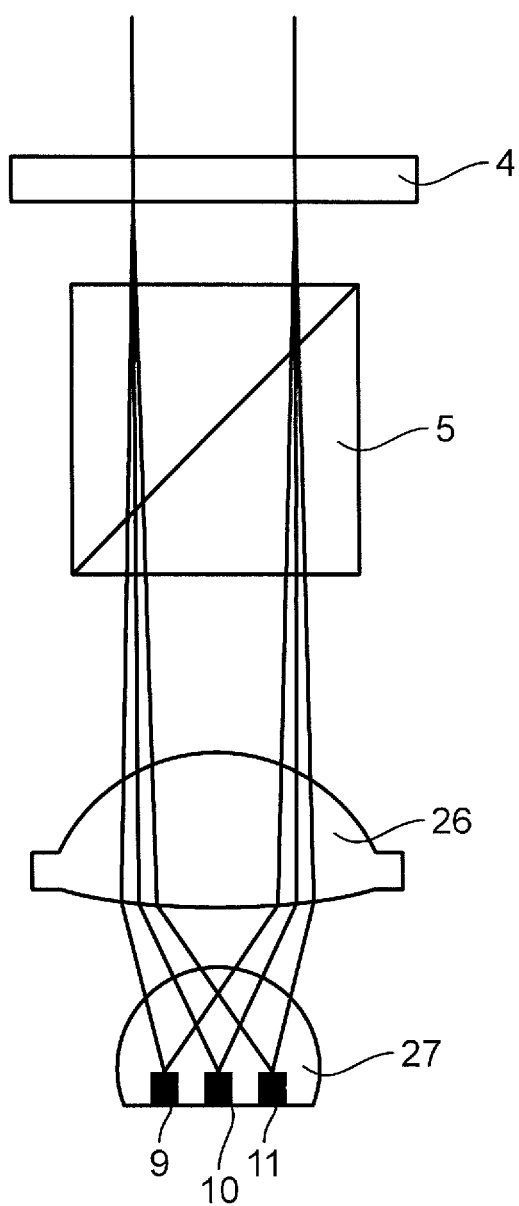
FIG. 8 is a diagram showing a configuration of an objective lens including a light collecting lens and a solid immersion lens in the first embodiment of the invention.

FIG. 7 is a diagram showing a configuration of an objective lens having a super hemispherical shape in the first embodiment of the invention. FIG. 8 is a diagram showing a configuration of an objective lens including a light collecting lens and a solid immersion lens in the first embodiment of the invention.

For instance, referring to FIG. 7, a solid immersion lens (super hemispherical lens 27) having a super hemispherical shape is disposed, in place of the objective lens 6 shown in FIG. 1, and the super hemispherical lens 27 is used as a light collecting lens. The first scattering medium 9, the second scattering medium 10, and the third scattering medium 11 are integrally disposed on a flat portion of the super hemispherical lens 27. Accordingly, unlike the configuration shown in FIG. 1, it is not necessary to adjust a relative position between a lens and a scattering medium. This is advantageous in simplifying the assembling/adjusting operation of an objective lens.

As described above, the shape of the objective lens may be a super hemispherical shape. Further, the objective lens may have a flat portion on a surface thereof facing the incident surface of the information medium. Furthermore, the scattering media may be embedded in the objective lens. Alternatively, the scattering media may be formed on a surface of the flat portion of the objective lens. In addition, the super hemispherical lens 27 shown in FIG. 7 may be a hemispherical lens having a hemispherical shape.

Further, referring to FIG. 8, an objective lens is constituted of the light collecting lens 26 and the super hemispherical lens 27 (solid immersion lens having a super hemispherical shape). In this configuration, assuming that "r" is the radius of the super hemispherical lens 27, the lens thickness of the super hemispherical lens 27 is represented by: $r \times (1+1/n)$, on the basis of the flat portion of the super hemispherical lens 27 as a reference. Assuming that "n" is the refractive index of the super hemispherical lens 27, it is possible to reduce the size of the light collecting spot by the light collecting lens 26 to $1/(n \times n)$ within the size of the super hemispherical lens 27.

Alternatively, referring to FIG. 8, the super hemispherical lens 27 may be a hemispherical lens having a hemispherical shape. In the above modification, assuming that "n" is the refractive index of the hemispherical lens, it is possible to reduce the size of the light collecting spot by the light collecting lens 26 to $1/n$ within the size of the hemispherical lens.

As described above, the objective lens may include at least two or more lenses. Further, a lens facing an information medium out of the at least two lenses may be a solid immersion lens having a hemispherical shape or a super hemispherical shape. The solid immersion lens has a flat portion on a surface thereof facing the incident surface of the information medium. In the above configuration, scattering media may be embedded in the solid immersion lens. Alternatively, the scattering media may be formed on a surface of the flat portion of the solid immersion lens In this embodiment, the optical information device is provided with two scattering media for detecting a gap interval. The invention is not specifically limited thereto. The optical information device may be provided with three or more scattering media for detecting a gap interval. For instance, the optical information device may be provided with four scattering media for detecting a gap interval. In the above modification, a pair of scattering media out of the four scattering media may be disposed to sandwich another scattering medium for use in recording or reproducing information, and another pair of scattering media out of the four scattering media may be disposed, with the three scattering media including the another scattering medium being interposed therebetween. According to the above configuration, a gap interval is roughly adjusted with use of reflected light from one of the paired scattering media, and a gap interval is finely adjusted with use of reflected light from the other of the paired scattering media.

As described above, the optical information device, the optical pickup and the gap control method of the first embodiment mainly have the following configuration.

Specifically, the optical information device of the first embodiment is provided with a plurality of scattering media, a light beam generating section which generates a plurality of light beams, a light guiding section which guides, to at least two scattering media out of the plurality of the scattering media, at least two light beams out of the plurality of the light beams, and a detecting section which detects a gap interval between the at least two scattering media and an information medium, based on a change in an amount of reflected light from the at least two scattering media.

According to the above configuration, for instance, it is possible to detect a gap interval between the at least two scattering media and the information medium with extremely high precision in the order of nanometers or in the order of sub-nanometers by detecting reflected light from the at least two scattering media.

Further, the gap control method of the first embodiment includes an irradiating step of irradiating at least two light beams out of a plurality of light beams onto at least two scattering media out of a plurality of scattering media, a detecting step of detecting a gap interval between the at least two scattering media and an information medium, based on a change in an amount of reflected light from the at least two scattering media, and a controlling step of controlling a distance between the at least two scattering media and the information medium, based on the detected gap interval.

According to the above method, for instance, it is possible to detect a gap interval between the at least two scattering media and the information medium with extremely high precision in the order of nanometers or in the order of sub-nanometers by detecting reflected light from the at least two scattering media.

Further, in the optical information device and the gap control method of the first embodiment, the amounts of reflected light from the at least two scattering media may be minimized at gap intervals different from each other.

According to the above configuration, it is possible to detect a difference between the amounts of reflected light from the at least two scattering media. According to the above configuration, it is possible to detect a gap interval between the at least two scattering media and an information medium with extremely high precision in the order of nanometers or in the order of sub-nanometers, based on the difference between the amounts of reflected light.

Further, in the optical information device and the gap control method of the first embodiment, the light beam generating section includes a light source which emits a light beam, and an optical element which separates the light beam from the light source into a plurality of light beams. Further, the light guiding section includes an objective lens which converges the plurality of the light beams split by the optical element. The light guiding section guides, to at least one scattering medium other than the at least two scattering media out of the plurality of the scattering media, at least one light beam other than the at least two light beams out of the plurality of the light beams. Information is recorded on the information medium or information is reproduced from the information medium with use of an optical electric field generated on the at least one scattering medium. The light guiding section guides, to the at least two scattering media other than the at least one scattering medium out of the plurality of the scattering media, the at least two light beams out of the plurality of the light beams. The detecting section detects a gap interval between the at least two scattering media and the information medium, based on a change in an amount of reflected light from the at least two scattering media.

Further, in the optical information device and the gap control method of the first embodiment, plasmon is generated on the plurality of the scattering media by irradiating the plurality of light beams onto the scattering media. Information may be recorded on the information medium, or information may be reproduced from the information recording medium with use of plasmon, and a gap interval may be detected with use of plasmon.

According to the above configuration, for instance, it is possible to form a light spot of a size equal to or smaller than the diffraction limit by using plasmon light. Accordingly, it is possible to record information on the information medium with a high density.

Further, in the optical information device and the gap control method of the first embodiment, there are provided two scattering media for detecting a gap interval. In the above configuration, the light guiding section may guide, to the two scattering media out of the plurality of the scattering media, two light beams out of the plurality of the light beams. The optical information device may be further provided with two light receiving elements which respectively receive reflected light from the two scattering media, and which respectively output electrical signals in proportional to the amounts of received light. The detecting section may detect a gap interval, based on a difference between the electrical signals output from the two light receiving elements.

According to the above configuration, for instance, it is easy to detect a gap interval between the two scattering media and the information medium with extremely high precision in the order of nanometers or in the order of sub-nanometers, based on a difference between electrical signals from the two light receiving elements.

Further, in the optical information device and the gap control method of the first embodiment, the at least two scattering media for detecting a gap interval may be disposed to be adjacent to the at least one scattering medium for use in recording or reproducing information.

According to the above configuration, it is possible to dispose the scattering media in the optical information device with a simplified configuration. This is advantageous in miniaturizing the optical information device.

Further, in the optical information device and the gap control method of the first embodiment, the amount of reflected light from the at least one scattering medium for use in recording or reproducing information may be minimized at a gap interval at which a difference between the electrical signals output from the two light receiving elements is minimized.

According to the above configuration, it is possible to determine a gap interval optimum for recording or reproducing information by detecting a gap interval that makes it possible to minimize a difference between the electrical signals output from the two light receiving elements.

Second Embodiment

Figure 9:
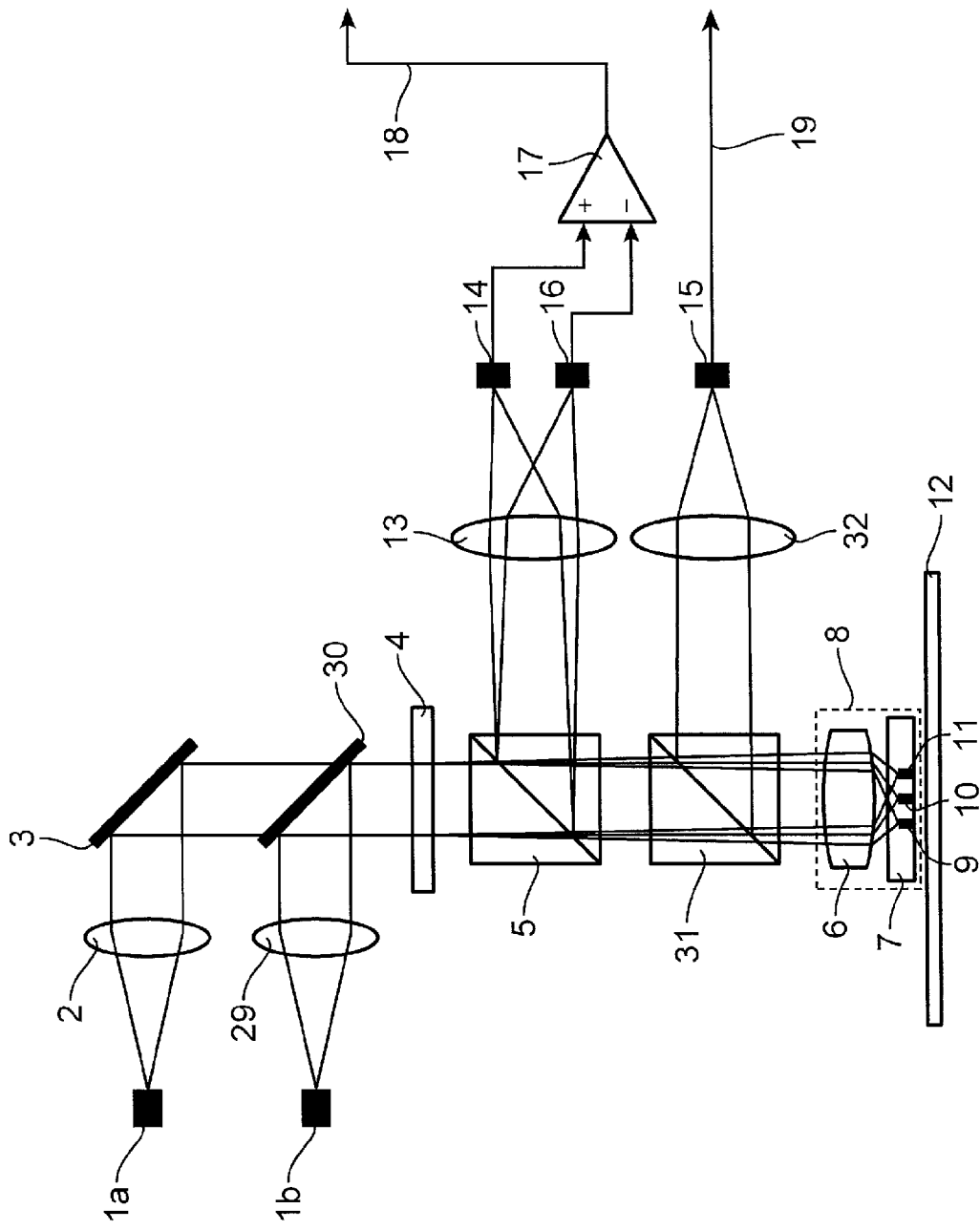
FIG. 9 is a diagram showing a configuration of an optical information device according to a second embodiment of the invention.

FIG. 9 is a diagram showing a configuration of an optical information device according to the second embodiment of the invention. Constituent elements of the optical information device shown in FIG. 9 substantially the same or equivalent to those shown in FIG. 1 are indicated with the same reference numerals as those shown in FIG. 1, and description thereof is omitted herein.

Unlike the optical information device of the first embodiment shown in FIG. 1, the optical information device of the second embodiment shown in FIG. 9 is provided with a laser for recording or reproducing information, and another laser for detecting a gap interval.

Specifically, a first laser light source 1a is used for recording or reproducing information, and a second laser light source 1b is used for detecting a gap interval.

The optical information device shown in FIG. 9 is provided with the first laser light source 1a, the second laser light source 1b, a collimator lens 2, a mirror 3, a diffraction element 4, a beam splitter 5, an objective lens unit 8, a detection lens 13, a first light detecting element 14, a second light detecting element 15, a third light detecting element 16, an arithmetic circuit 17, a collimator lens 29, a mirror 30, a beam splitter 31, and a detection lens 32. The objective lens unit 8 is provided with an objective lens 6 and a substrate 7. The substrate 7 is provided with a first scattering medium 9, a second scattering medium 10, and a third scattering medium 11. It should be noted that an optical pickup is provided with the aforementioned configuration except for the arithmetic circuit 17.

In this embodiment, the first laser light source 1a and the second laser light source 1b correspond to an example of a plurality of light sources.

Referring to FIG. 9, as well as in the first embodiment, laser light emitted from the first laser light source 1a is converted into parallel light by the collimator lens 2, and is bent in a direction toward the objective lens unit 8 by the mirror 3.

Laser light reflected on the mirror 3 is transmitted through the diffraction element 4 without being diffracted by the diffraction element 4. The laser light transmitted through the diffraction element 4 is transmitted through the beam splitter 5 and through the beam splitter 31, and then, is collected on the second scattering medium 10 formed on a surface of the substrate 7 through the objective lens 6. The second scattering medium 10 generates plasmon light for recording or reproducing information to or from an information medium 12.

Information is reproduced from the information medium 12 by detecting an amount of reflected light from the second scattering medium 10.

Reflected light from the second scattering medium 10 is transmitted through the objective lens 6, is reflected on the beam splitter 31, and is collected on the second light detecting element 15 through the detection lens 32. The second light detecting element 15 receives reflected light from the second scattering medium 10, and converts the received light into an electrical signal according to the amount of reflected light. The electrical signal from the second light detecting element 15 is sent to an unillustrated signal processor as a reproduction signal 19. The signal processor outputs a signal recorded on the information medium 12 as a digital signal.

Further, referring to FIG. 9, laser light emitted from the second laser light source 1b is converted into parallel light by the collimator lens 29, and is bent in a direction toward the objective lens unit 8 by the mirror 30.

Laser light reflected on the mirror 30 is diffracted by the diffraction element 4, and is separated into light beams (two light beams). The two light beams diffracted by the diffraction element 4 are transmitted through the beam splitter 5 and through the beam splitter 31, and then, are collected on the first scattering medium 9 and the third scattering medium 11 formed on a surface of the substrate 7 through the objective lens 6. The first scattering medium 9 and the third scattering medium 11 generate plasmon light for detecting a gap interval substantially by the same method as described in the first embodiment.

Reflected light from the first scattering medium 9 and from the third scattering medium 11 is transmitted through the objective lens 6 and through the beam splitter 31, is reflected on the beam splitter 5, and is respectively collected on the first light detecting element 14 and on the third light detecting element 16 through the detection lens 13.

The first light detecting element 14 and the third light detecting element 16 receive reflected light from the first scattering medium 9 and from the third scattering medium 11, and convert the respective received light into electrical signals according to the amounts of reflected light. The electrical signals from the first light detecting element 14 and from the third light detecting element 16 are converted into a gap error signal 18 by the arithmetic circuit 17.

In this way, the objective lens 6 guides a light beam from the first laser light source 1a to the second scattering medium 10. Information is recorded on the information medium 12 or information is reproduced from the information medium 12 with use of an optical electric field generated on the second scattering medium 10. The objective lens 6 guides a light beam from the second laser light source 1b to the first scattering medium 9 and to the third scattering medium 11. The arithmetic circuit 17 detects a gap interval between the first scattering medium 9 and the third scattering medium 11, and the information medium 12, based on a change in an amount of reflected light from the first scattering medium 9 and from the third scattering medium 11.

According to the above configuration, an optical system for recording information and generating a reproduction signal, and an optical system for detecting a gap interval so as to generate a gap error signal are provided independently of each other. Accordingly, it is possible to reduce noise, which may occur resulting from mutual interference between laser light for recording or reproducing information, and laser light for detecting a gap interval.

Preferably, the first laser light source 1a and the second laser light source 1b in the second embodiment may emit laser light having wavelengths different from each other or having polarized states different from each other. According to the above configuration, it is easy to separate light by the beam splitter 5 and by the beam splitter 31. Further, it is possible to change the diffraction efficiency of the diffraction element 4 with respect to each of the laser light.

As described above, the optical information device and the gap control method of the second embodiment mainly have the following configuration.

Specifically, the optical information device of the second embodiment is provided with a plurality of scattering media, a light beam generating section which generates a plurality of light beams, a light guiding section which guides, to at least two scattering media out of the plurality of the scattering media, at least two light beams out of the plurality of the light beams, and a detecting section which detects a gap interval between the at least two scattering media and an information medium, based on a change in an amount of reflected light from the at least two scattering media.

According to the above configuration, for instance, it is possible to detect a gap interval between the at least two scattering media and the information medium with extremely high precision in the order of nanometers or in the order of sub-nanometers by detecting reflected light from the at least two scattering media.

Further, the gap control method of the second embodiment includes an irradiating step of irradiating at least two light beams out of a plurality of light beams onto at least two scattering media out of a plurality of scattering media, a detecting step of detecting a gap interval between the at least two scattering media and an information medium, based on a change in an amount of reflected light from the at least two scattering media, and a controlling step of controlling a distance between the at least two scattering media and the information medium, based on the detected gap interval.

According to the above method, for instance, it is possible to detect a gap interval between the at least two scattering media and the information medium with extremely high precision in the order of nanometers or in the order of sub-nanometers by detecting reflected light from the at least two scattering media.

Further, in the optical information device and the gap control method of the second embodiment, the light beam generating section may include a plurality of light sources which emit a light beam. The light guiding section may guide, to at least one scattering medium other than the at least two scattering media out of the plurality of the scattering media, a light beam from at least one light source out of the plurality of the light sources for recording or reproducing information to or from the information medium with use of an optical electric field generated on the at least one scattering medium. The light guiding section may guide a light beam from at least another one of the plurality of the light sources other than the at least one light source to the at least two scattering media. The detecting section may detect a gap interval between the at least two scattering media and the information medium, based on a change in an amount of reflected light from the at least two scattering media.

According to the above configuration, it is easy to separate a light beam for recording or reproducing information, and a light beam for detecting a gap interval by a wavelength separation element, for instance. In the above configuration, it is possible to reduce the mutual interference between laser light for recording or reproducing information, and laser light for detecting a gap interval. This is advantageous in reducing noise, which may be included in a reproduction signal and in a gap detection signal.

Third Embodiment

Figure 10:
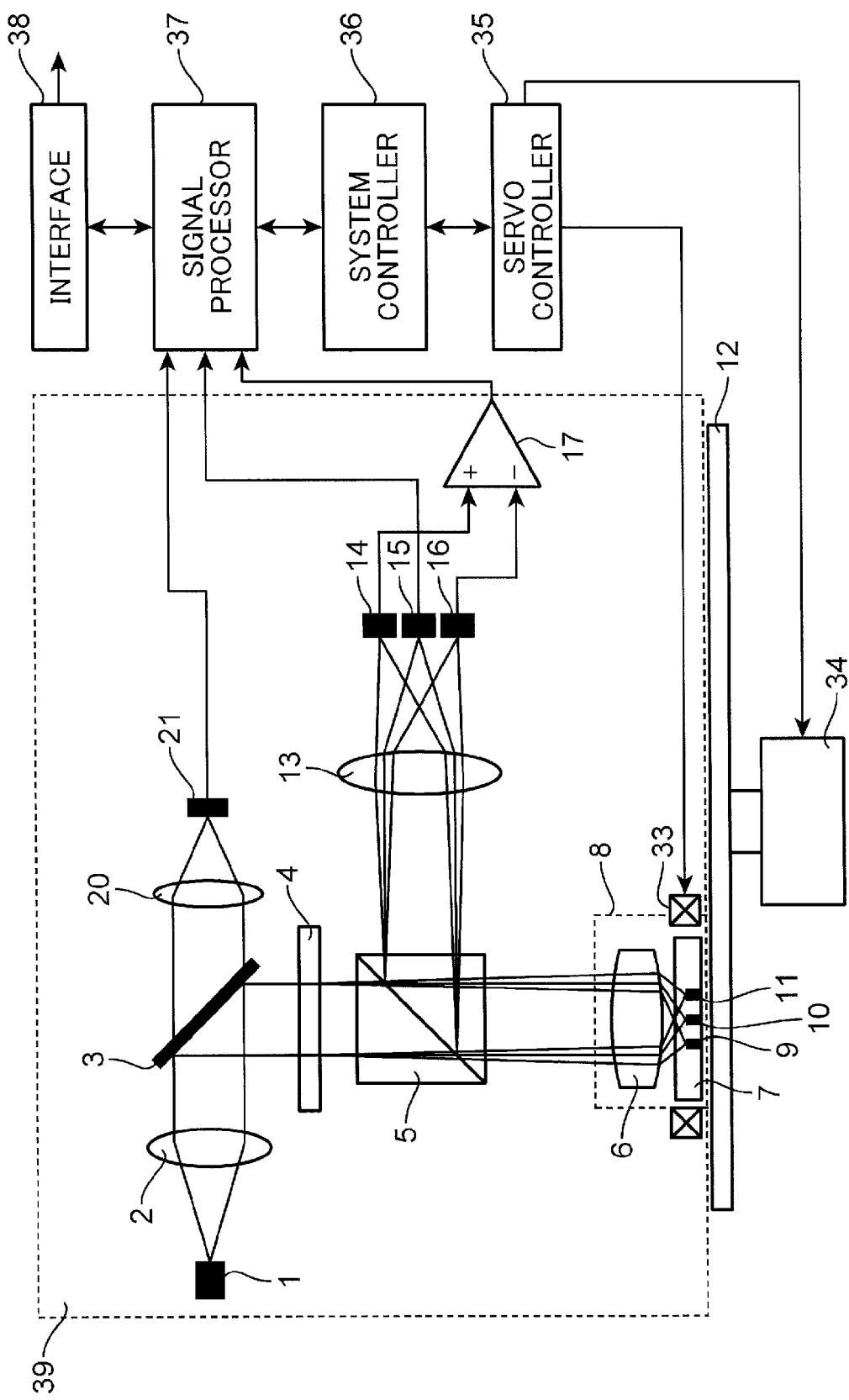
FIG. 10 is a diagram showing a configuration of an optical disc driving device according to a third embodiment of the invention.

In this section, an optical disc driving device according to the third embodiment of the invention is described referring to FIG. 10.

FIG. 10 is a diagram showing a configuration of the optical disc driving device according to the third embodiment of the invention.

An optical information device 39 shown in FIG. 10 is the optical information devices described in the first embodiment and in the second embodiment. Constituent elements of the optical information device shown in FIG. 10 substantially the same or equivalent to those shown in FIG. 1 are indicated with the same reference numerals as those shown in FIG. 1, and detailed description thereof will be omitted herein.

As shown in FIG. 10, the optical disc driving device of the third embodiment is provided with an optical information device 39, a spindle motor 34, a signal processor 37, an interface 38, a servo controller 35, an unillustrated feed motor, and a system controller 36.

The spindle motor 34 is controlled and driven by the servo controller 35 to rotate an information medium 12 at a predetermined rotation number.

The optical information device 39 is disposed in proximity to the information medium 12 which is rotated by the spindle motor 34. In the optical information device 39, information is recorded by forming fine marks on a recording surface of the information medium 12 by plasmon light generated on a second scattering medium 10, which is disposed in proximity to the information medium 12. Further, an information signal is read from the information medium 12, based on an optical feedback from the second scattering medium 10.

Further, the optical information device 39 is supported to be movable in a direction (tracking direction) perpendicular to a recording track on the information medium 12. The unillustrated feed motor drives the optical information device 39 in a direction perpendicular to the recording track on the information medium 12.

The signal processor 37 performs various signal processing with respect to a signal output from the optical information device 39. Specifically, the signal processor 37 is provided with a signal demodulator and an error correction circuit as a system for reproducing an information signal, and is provided with a signal modulator as a system for recording an information signal. In reproducing information, the signal processor 37 demodulates a reproduction signal read from the information medium 12 by the optical information device 39, with use of the signal demodulator; and performs error correction with use of the error correction circuit.

The interface 38 sends and receives data to and from an externally connected electronic device. An example of the externally connected electronic device is an external computer.

For instance, in the case where a reproduction operation is performed in the optical disc driving device, a reproduction signal that has undergone signal processing by the signal demodulator and the error correction circuit in the signal processor 37 is sent to the external computer via the interface 38.

The servo controller 35 controls the spindle motor 34 and the optical information device 39, based on an electrical signal obtained from the optical information device 39. The servo controller 35 servo-controls a lens driver 33 such as a dual axis actuator which drives an objective lens unit 8 in the optical information device 39 for moving the objective lens unit 8 in a focusing direction and in a tracking direction.

Further, the servo controller 35 servo-controls the unillustrated feed motor for feeding the optical information device 39.

Further, the servo controller 35 servo-controls the spindle motor 34 for driving and rotating the information medium 12. The servo controller 35 performs the aforementioned servo control of the respective parts, based on a control signal from the system controller 36. The system controller 36 controls the respective parts constituting the optical disc driving device.

In the thus configured optical disc driving device, in reproducing information from the information medium 12, demodulation by the signal demodulator in the signal processor 37, and error correction by the error correction circuit in the signal processor 37 are performed with respect to a reproduction signal read from the information medium 12 being rotated by the spindle motor 34, with use of the optical information device 39. Then, the reproduction signal that has undergone the signal processing is sent to the externally connected electronic device via the interface 38.

Further, in the optical disc driving device, in recording information on the information medium 12, an information signal is modulated by the signal modulator in the signal processor 37, and recording laser light having a predetermined laser output based on the modulated information signal is irradiated from the optical information device 39 onto the information medium 12 being rotated by the spindle motor 34.

In the third embodiment, the optical information device 39 corresponds to an example of an optical information device, the spindle motor 34 corresponds to an example of a motor, and the servo controller 35, the system controller 36, and the signal processor 37 correspond to an example of a control section. Further, the servo controller 35, the system controller 36, and the signal processor 37 also function in performing gap control described in the first embodiment and in the second embodiment.

Specifically, the signal processor 37 performs predetermined signal processing with respect to a gap error signal detected by an arithmetic circuit 17, and outputs the processed signal to the servo controller 35. The servo controller 35 controls a gap between the first scattering medium 9 and the third scattering medium 11, and the information medium 12, based on a gap error signal indicating a gap interval detected by the arithmetic circuit 17. The servo controller 35 controls the optical information device 39 to move in a direction perpendicular to the surface of the information medium 12, based on the gap error signal, so as to control the gap interval. The optical disc driving device is provided with a head driver which moves the optical information device 39 in a direction perpendicular to the surface of the information medium 12.

Fourth Embodiment

Figure 11:
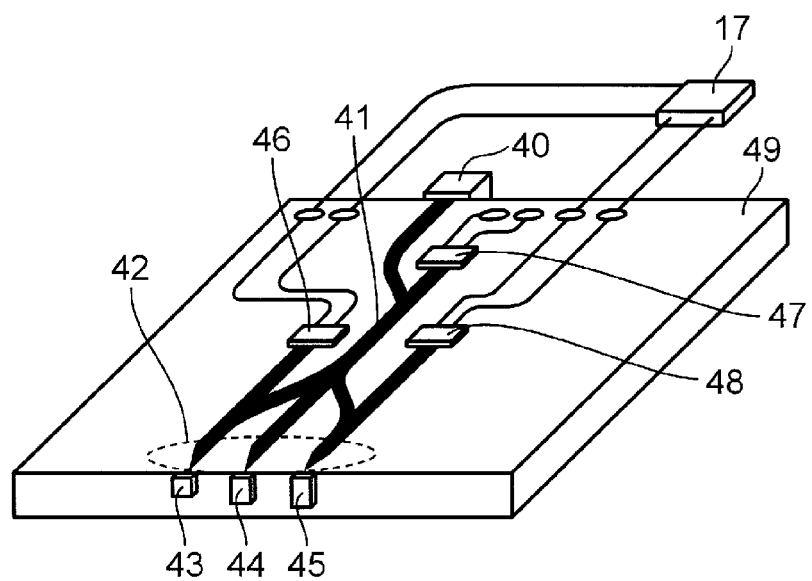
FIG. 11 is a diagram showing a configuration of an optically integrated optical information device according to a fourth embodiment of the invention.

FIG. 11 is a diagram showing a configuration of an optically integrated optical information device according to the fourth embodiment of the invention.

Unlike the optical information devices described in the first to third embodiments, the optically integrated optical information device shown in FIG. 11 has a structure, in which the constituent elements of the optical information device are integrated on a substrate 49 with use of an optical waveguide or a like member.

Examples of the substrate 49 are a silicon substrate, an $LiNbO_3$ substrate, and a glass substrate. An optical waveguide is formed on a surface of the substrate 49. Laser light sources, photodetectors, scattering media, etc. are disposed on the substrate 49 with use of a technology such as semiconductor processing.

The optical information device shown in FIG. 11 is provided with a semiconductor laser element 40, an optical waveguide 41, a tapered connector 42, a first scattering medium 43, a second scattering medium 44, a third scattering medium 45, a first light detecting element 46, a second light detecting element 47, a third light detecting element 48, and an arithmetic circuit 17. It should be noted that an optical pickup is provided with the aforementioned configuration except for the arithmetic circuit 17.

The semiconductor laser element 40, the optical waveguide 41, the tapered connector 42, the first scattering medium 43, the second scattering medium 44, the third scattering medium 45, the first light detecting element 46, the second light detecting element 47, and the third light detecting element 48 are disposed on the substrate 49. In FIG. 11, the arithmetic circuit 17 is not disposed on the substrate 49, but may be disposed on the substrate 49.

In this embodiment, the semiconductor laser element 40 corresponds to an example of a light source, the optical waveguide 41 corresponds to an example of an optical waveguide, and the tapered connector 42 corresponds to an example of a tapered waveguide.

Referring to FIG. 11, laser light emitted from the semiconductor laser element 40 disposed at an end surface of the substrate 49 propagates through the optical waveguide 41 formed on a surface of the substrate 49, and is separated into three laser light by a split waveguide structure or a like structure. The respective separated laser light is transmitted through the tapered connector 42 having a tapered structure, and then, is respectively irradiated onto a first scattering medium 43, a second scattering medium 44, and a third scattering medium 45.

The optically integrated optical information device shown in FIG. 11 has substantially the same operations and effects as the optical information device of the first embodiment shown in FIG. 1, by disposing the first scattering medium 43, the second scattering medium 44, and the third scattering medium 45 in proximity to an unillustrated information medium with a very small gap. The roles of the first scattering medium 43, the second scattering medium 44, and the third scattering medium 45 are substantially the same as those of the first scattering medium 9, the second scattering medium 10, and the third scattering medium 11 in the first embodiment shown in FIG. 1.

In the above configuration, for instance, information is recorded or reproduced to or from an information medium with use of plasmon light generated on the second scattering medium 44, and a gap interval between the optically integrated optical information device and the information medium is detected with use of reflected light from the first scattering medium 43 and from the third scattering medium 45.

Reflected light from the first scattering medium 43 and from the third scattering medium 45 propagates through the optical waveguide 41 again, is split into light beams by an Y-shaped branch waveguide or a like member, and then, the split light beams are respectively guided to the first light detecting element 46 and to the third light detecting element 48.

Upon receiving the reflected light from the first scattering medium 43 and from the third scattering medium 45, the first light detecting element 46 and the third light detecting element 48 convert the received light into electrical signals according to the amounts of reflected light. The electrical signals output from the first light detecting element 46 and from the third light detecting element 48 are converted into a gap error signal by the arithmetic circuit 17.

On the other hand, reflected light from the second scattering medium 44 propagates through the optical waveguide 41 again, is spilt into light beams by the Y-shaped branch waveguide or a like member, and is guided to the second light detecting element 47.

Upon receiving the reflected light from the second scattering medium 44, the second light detecting element 47 converts the received light into an electrical signal according to the amount of reflected light. The electrical signal from the second light detecting element 47 is sent to an unillustrated signal processor as a reproduction signal. The signal processor outputs a signal recorded on the information medium as a digital signal.

As described above, the optical information device and the gap control method of the fourth embodiment mainly have the following configuration.

In the optical information device and the gap control method of the fourth embodiment, the light beam generating section includes a light source. Further, the light guiding section includes an optical waveguide which guides the light beam from the light source, and a tapered waveguide which converges the light beam propagating through the optical waveguide. Information is recorded on the information medium or information is reproduced from the information medium with use of an optical electric field generated on at least one scattering medium other than the at least two scattering media out of the plurality of the scattering media. Further, the detecting section may detect a gap interval between the at least two scattering media and the information medium, based on a change in an amount of reflected light from the at least two scattering media other than the at least one scattering medium for use in recording or reproducing information.

According to the above configuration, it is possible to enhance the stability of the optical performance of the optical information device by integrating optical elements on a substrate with use of the optical waveguide, for instance. Further, in the above configuration, it is possible to omit a step of adjusting or adhering constituent components of the optical information device. The above configuration is advantageous in reducing the manufacturing cost.

According to the configuration of the fourth embodiment, it is possible to implement an ultra-miniaturized optically integrated optical information device.

Further, the optical information device of the fourth embodiment has a structure, in which optical elements are integrated on a substrate. Accordingly, it is possible to omit a step of adjusting, adhering, or fixing the optical components by applying a conventional fine processing technology. Thus, the above configuration is advantageous in implementing an inexpensive optical information device while reducing the manufacturing cost.

Further, the optical information device of the fourth embodiment has a structure, in which optical elements are integrated on a substrate. Thus, the above configuration is advantageous in implementing a stabilized optical information device with less influence such as aging change.

Fifth Embodiment

Figure 12:
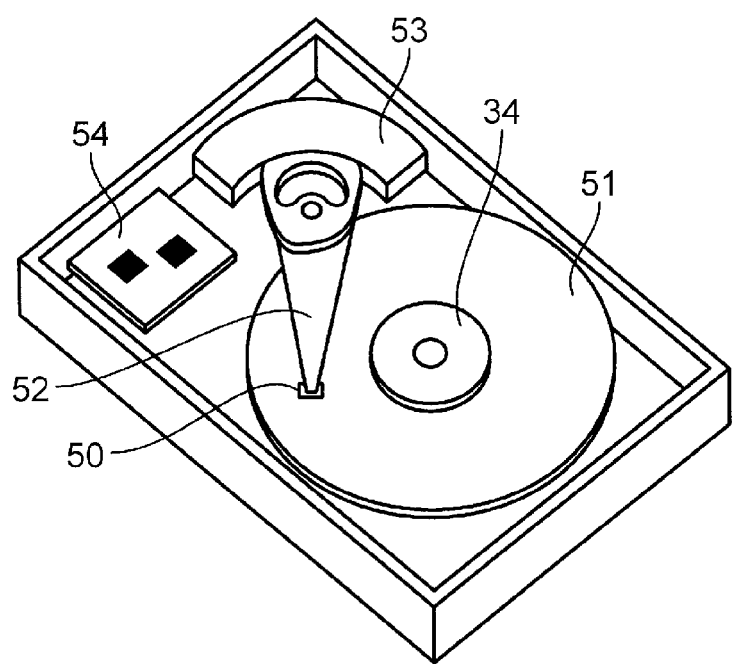
FIG. 12 is a diagram showing a configuration of an optical disc driving device according to a fifth embodiment of the invention.

In this section, an optical disc driving device according to the fifth embodiment of the invention is described referring to FIG. 12.

FIG. 12 is a diagram showing a configuration of the optical disc driving device according to the fifth embodiment of the invention.

The fifth embodiment is an embodiment of an optical disc driving device provided with the optically integrated optical information device according to the fourth embodiment.

Referring to FIG. 12, the optical disc driving device is provided with a spindle motor 34, an optically integrated element 50, a swing arm 52, a voice coil actuator 53, and a control circuit 54. The optically integrated element 50 is an optically integrated optical information device for recording information on an information medium 51 or reproducing information from the information medium 51. The swing arm 52 is configured to fix the optically integrated element 50. The voice coil actuator 53 is configured to move the optically integrated element 50 to an intended position on the information medium 51.

The control circuit 54 processes an electrical signal from the optically integrated element 50, and outputs a reproduction signal, a control signal or the like for controlling the position of the optically integrated element 50 by the voice coil actuator 53. The control circuit 54 has substantially the same function as the servo controller 35, the system controller 36, the signal processor 37, and the interface 38 shown in FIG. 10. The spindle motor 34 rotates the information medium 51.

The swing arm 52 moves the optically integrated element 50 relative to the information medium 51. The spindle motor 34 rotates the information medium 51, and lifts the optically integrated element 50 above the information medium 51 by a predetermined distance, using a rotational force of the information medium 51.

The information medium 51 is rotated at a high speed by the spindle motor 34. Further, the optically integrated element 50 is moved to an intended position on the information medium 51 via the swing arm 52 by the voice coil actuator 53.

In performing the above operation, the optically integrated element 50 is lifted above the information medium 51 with a gap interval of several nanometers to several ten nanometers, using a rotational force of the information medium 51. The gap interval is feedback controlled by an unillustrated actuator to keep the gap interval to a constant value, based on a gap error signal from the optically integrated element 50 having substantially the same configuration as the optical information device of the fourth embodiment. An example of the actuator is a piezoelectric element. The actuator moves the optically integrated element 50 in an optical axis direction so as to keep the distance between the optically integrated element 50 and the information medium 51 to a constant value.

In the fifth embodiment, it is easy to determine the initial position on the gap interval between the optically integrated element 50 and the information medium 51, using a rotational force of the information medium 51, without using a dedicated actuator. Thus, the above configuration is advantageous in implementing an optical disc driving device with a simplified configuration.

Sixth Embodiment

Figure 13:
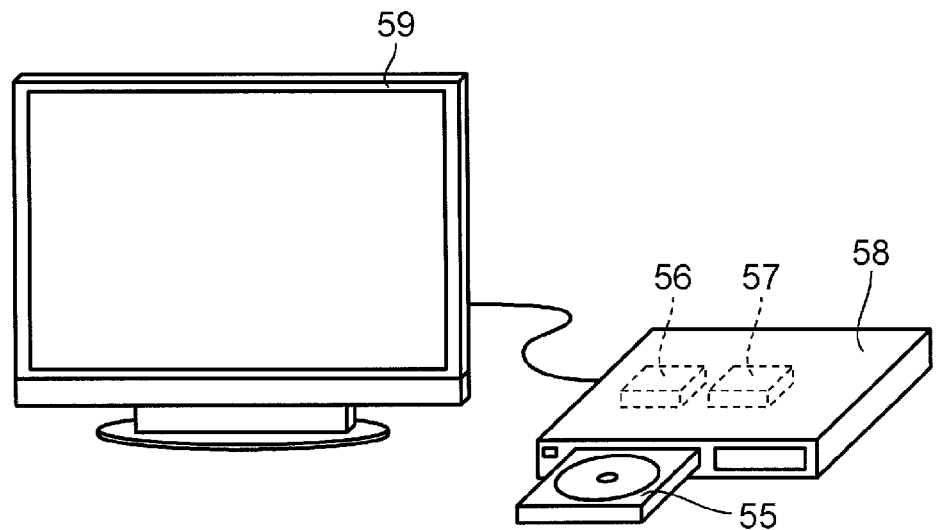
FIG. 13 is a diagram showing a configuration of an optical information recording or reproducing device according to a sixth embodiment of the invention.

In this section, an optical information recording device and an optical information reproducing device according to the sixth embodiment of the invention are described referring to FIG. 13.

FIG. 13 is a diagram showing a configuration of an optical information recording or reproducing device according to the sixth embodiment of the invention.

The sixth embodiment is an embodiment of an optical information recording or reproducing device provided with the optical disc driving device according to the third embodiment or according to the fifth embodiment.

An optical information recording or reproducing device 58 shown in FIG. 13 is provided with an optical disc driving device 55, a recording signal processor (recording information processing section) 56, and a reproduction signal processor (reproduction information processing section) 57. The optical disc driving device 55 is an optical disc driving device according to the third embodiment or according to the fifth embodiment. The recording signal processor 56 converts image information into an information signal for recording on an information medium by the optical disc driving device 55. The recording signal processor 56 processes information for recording on the information medium by the optical disc driving device 55. The reproduction signal processor 57 converts an information signal obtained from the optical disc driving device 55 into image information. The reproduction signal processor 57 processes information reproduced from the information medium by the optical disc driving device 55.

The optical information recording or reproducing device 58 of the sixth embodiment is provided with the recording signal processor 56 and the reproduction signal processor 57. The invention, however, is not specifically limited to the above. Only one of the recording signal processor 56 and the reproduction signal processor 57 may be provided. Further, the optical information recording or reproducing device 58 may be provided with an output device 59 such as a CRT or a liquid crystal display device for displaying information.

In the sixth embodiment, the optical information recording or reproducing device 58 corresponds to an example of an optical information recording device and an optical information reproducing device, the recording signal processor 56 corresponds to an example of a recording information processing section, and the reproduction signal processor 57 corresponds to an example of a reproduction information processing section.

The optical information recording or reproducing device according to the sixth embodiment is provided with the optical disc driving device 55 according to the third embodiment or according to the fifth embodiment, and information can be stably recorded or reproduced to or from an information medium for recording or reproducing information by plasmon light. In the above configuration, it is possible to use the optical information recording or reproducing device according to the sixth embodiment for a variety of purposes.

Seventh Embodiment

An information medium 12 may have a recording layer. The recording layer may contain a dielectric material, a metal material, or a phase changing material. The materials contained in the recording layer are not limited to the above, as far as it is possible to generate plasmon resonance.

Further, an example of the phase changing material may be an alloy containing at least two elements from among Ge, Sb, Te, Bi, Tb, Fe, Co, Sn, Au, and Ag. More specifically, examples of the phase changing material may be the materials containing $Te_{60}Ge_4Sn_{11}Au_{25}$, $Ag_4InSb_{76}Te_{16}$, GeTe—$Sb_2Te_3$, GeTe—$Bi_2Te_3$, GeTe, (Ge—Sn)Te, GeTe—$Bi_2Te_3$, (Ge—Sn)Te—$Bi_2Te_3$, Sb—Ge, GeTe, (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—(Sb—Bi)$_2Te_3$, (Ge—Sn)Te—(Sb—Bi)$_2Te_3$, GeTe—(Bi—In)$_2Te_3$, (Ge—Sn)Te—(Bi—In)$_2Te_3$, Sb—Ga, (Sb—Te)—Ga, Sb—Ge, (Sb—Te)—Ge, Sb—In, (Sb—Te)—In, Sb—In, (Sb—Te)—In, Sb—Mn—Ge, Sb—Sn—Ge, Sb—Mn—Sn—Ge, or (Sb—Te)—Ag—In.

Figure 14:
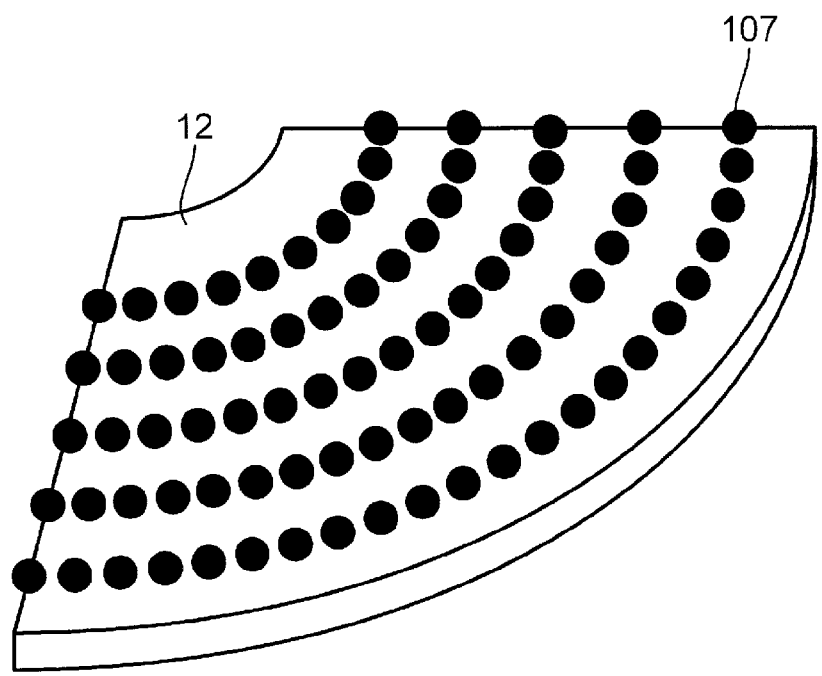
FIG. 14 is a schematic diagram showing an information medium, in which particles are disposed in the form of a track.

Further, as shown in FIG. 14, particles 107 may be formed on the information medium 12. FIG. 14 is a schematic diagram showing an information medium, in which particles are disposed in the form of a track. Further, the particles 107 may be disposed in the form of tracks. The diameter of the particle 107 may be equal to or smaller than 30 nm, for instance, 10 nm.

Further, the shape of the particle 107 may be a spherical shape, a hemispherical shape, or an elongated hemispherical shape. Alternatively, the shape of the particle 107 may be a columnar shape or an elongated columnar shape. Further alternatively, the shape of the particle 107 may be a cubic shape or a rectangular parallelepiped shape.

Further, the particles 107 may contain a dielectric material, or a material containing metal. Alternatively, the particles 107 may contain the aforementioned phase changing material. According to the above configuration, irradiating plasmon light onto the particles 107 makes it possible to change the particles 107 from an amorphous state to a crystalline state. It is possible to record information on the particles 107 individually, utilizing the above phenomenon. For instance, a recording state may correspond to a crystalline state, and an unrecorded state may correspond to an amorphous state. Conversely to the above, a recording state may correspond to an amorphous state, and an unrecorded state may correspond to a crystalline state.

Further, tracks may be formed on the information medium 12. For instance, the tracks may be formed by disposing the particles 107 in the form of arrays. Further, the tracks may be formed by disposing particles 107 made of two kinds of materials different from each other alternately to be adjacent to each other and concentrically.

Further, the amounts of reflected light from a first scattering medium 9 and from a third scattering medium 11 may be changed depending on a distance between the first scattering medium 9 and the third scattering medium 11, and a track.

Preferably, in the optical information device, tracking control may be performed in such a manner that a second scattering medium 10 for use in recording or reproducing information to or from an intended track is disposed on the intended track. According to the above configuration, it is possible to record or reproduce information to or from a particle 107 on an intended track with use of the second scattering medium 10.

In performing the above operation, if the second scattering medium 10 is displaced from an intended track in a direction (tracking direction) perpendicular to the intended track, it is difficult to accurately irradiate plasmon light generated on the second scattering medium 10 onto the intended track. The above displacement is called off-tracking.

Figure 15:
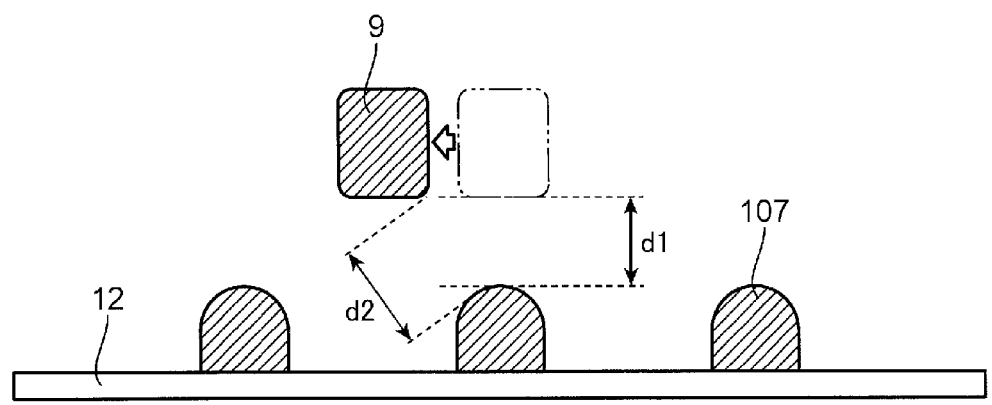
FIG. 15 is a schematic diagram for describing a change in the distance between a scattering medium and a particle due to off-tracking.

FIG. 15 is a schematic diagram for describing a change in the distance between a scattering medium and a particle due to off-tracking.

As shown in FIG. 15, in the case where a scattering medium and a track have a one-to-one correspondence, the distance between the first scattering medium 9 and the track may vary from the distance d1 to the distance d2 due to off-tracking. In the above case, the gap interval does not change before and after the off-tracking, but a resonance state of the first scattering medium 9 may change resulting from the distance variation between the first scattering medium 9 and the track.

As a result, a gap interval may be erroneously detected, and gap control may be erroneously performed, regardless of the fact that the actual gap interval between the scattering medium and the information medium 12 is not changed. In such a case, it is difficult to stably perform gap control.

In view of the above, the optical information device of the seventh embodiment may be further provided with a tracking controller which corrects displacement of at least two scattering media for use in detecting a gap interval in a direction perpendicular to a track. In the above configuration, the servo controller 35 shown in FIG. 10 has the function of the tracking controller.

According to the above configuration, it is possible to suppress displacement of a scattering medium in a direction perpendicular to a track, in other words, to suppress lowering of the irradiation precision of plasmon light with respect to a track (or a particle 107) due to off-tracking, and erroneous detection of a gap interval. The above configuration is advantageous in stably performing gap control.

Alternatively, the optical information device of the seventh embodiment may be provided with a gap interval storage which stores gap intervals detected a number of times during a predetermined period of time when the optical information device scans on the information medium 12. The optical information device may be further provided with a gap average calculator which calculates an average value of the gap intervals stored in the gap interval storage.

Figure 16:
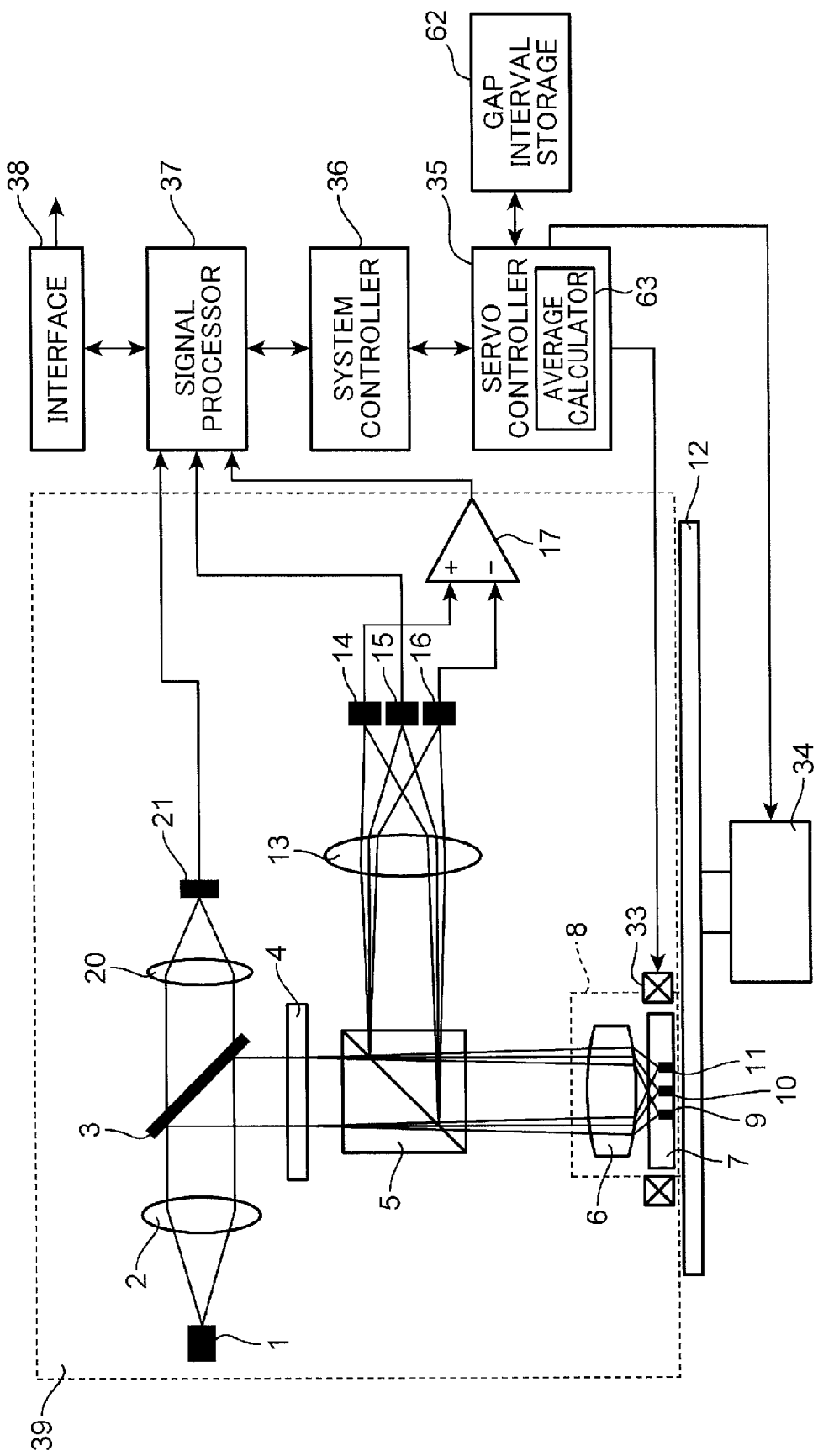
FIG. 16 is a diagram showing a configuration of an optical disc driving device according to a seventh embodiment of the invention.

FIG. 16 is a diagram showing a configuration of an optical disc driving device according to the seventh embodiment of the invention. Constituent elements of the optical disc driving device shown in FIG. 16 substantially the same or equivalent to those shown in FIG. 1 and in FIG. 10 are indicated with the same reference numerals as those shown in FIG. 1 and in FIG. 10, and detailed description thereof is omitted herein.

The optical disc driving device shown in FIG. 16 is provided with an optical information device 39, a spindle motor 34, a signal processor 37, an interface 38, a servo controller 35, an unillustrated feed motor, a system controller 36, and a gap interval storage 62.

Tracks are formed on the information medium 12. The amounts of reflected light from at least two scattering media (the first scattering medium 9 and the third scattering medium 11) are changed depending on a distance between each of the scattering media and a track.

The gap interval storage 62 stores gap intervals detected a number of times by an arithmetic circuit 17 during a predetermined period of time when the optical information device 39 scans on the information medium 12.

The servo controller 35 is provided with an average calculator 63. The average calculator 63 calculates an average value of the gap intervals stored in the gap interval storage 62 during the predetermined period of time when the optical information device 39 scans on the information medium 12.

The servo controller 35 controls a gap interval, based on the average value of the gap intervals calculated by the average calculator 63.

According to the above configuration, it is possible to reduce an influence resulting from detection variation of a gap interval due to temporary off-tracking. This is advantageous in stably performing gap control.

In this embodiment, the gap interval storage 62 corresponds to an example of a gap interval storing section, and the average calculator 63 corresponds to an example of a gap average calculating section.

Further, in the optical information device according to the seventh embodiment, the size or the shape of the first scattering medium 9 or the third scattering medium 11 for use in detecting a gap interval may be designed in such a manner that the first scattering medium 9 or the third scattering medium 11 interacts with the tracks. For instance, in the case where the first scattering medium 9 or the third scattering medium 11 has a columnar shape as shown in FIG. 2, the diameter of a bottom surface of the columnar shaped scattering medium may be set larger than the track pitch (track interval) of the tracks on which the particles 107 are disposed so that the first scattering medium 9 or the third scattering medium 11 interacts with the particles 107 disposed on the tracks.

Alternatively, in the case where the first scattering medium 9 or the third scattering medium 11 has a triangular prismatic shape, the length and the thickness of the triangular prismatic shaped scattering medium may be set so that the first scattering medium 9 or the third scattering medium 11 interacts with the particles 107 disposed on the tracks.

Further, in the case where the first scattering medium 9 or the third scattering medium 11 has a spheroidal shape, at least one of the lengths corresponding to the major axis and the minor axis of the spheroidal shaped scattering medium may be set larger than the track pitch of the tracks constituted of the particles 107 so that the first scattering medium 9 or the third scattering medium 11 interacts with the particles 107 disposed on the tracks.

Furthermore, in the case where the first scattering medium 9 or the third scattering medium 11 has an elliptically columnar shape, the length corresponding to the major axis of a bottom surface of the elliptically columnar shaped scattering medium may be set larger than the track pitch of the tracks constituted of the particles 107 so that the first scattering medium 9 or the third scattering medium 11 interacts with the particles 107 disposed on the tracks.

Figure 17:
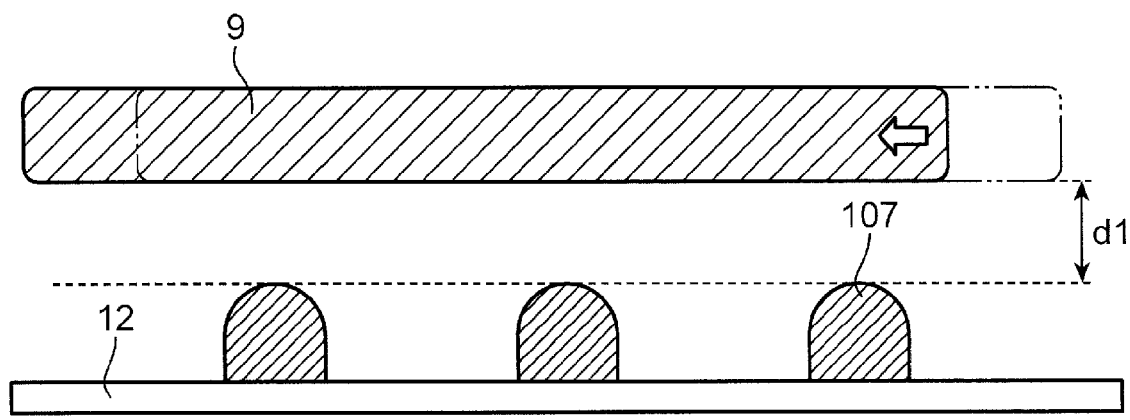
FIG. 17 is a schematic diagram for describing a change in the distance between a scattering medium and a particle, in the case where the length of the scattering medium in the tracking direction is larger than the track pitch.

FIG. 17 is a schematic diagram for describing a change in the distance between a scattering medium and a particle, in the case where the length of the scattering medium in a tracking direction is larger than the track pitch. In FIG. 17, only the first scattering medium 9 is illustrated, but the third scattering medium 11 may be configured substantially in the same manner as the first scattering medium 9.

Tracks are formed on the information medium 12. The amounts of reflected light from at least two scattering media (the first scattering medium 9 and the third scattering medium 11) are changed depending on a distance between each of the scattering media and a track. As shown in FIG. 17, at least one of the at least two scattering media (the first scattering medium 9 and the third scattering medium 11) interacts with at least two tracks out of the tracks.

For instance, in FIG. 17, at least one of the shapes of the first scattering medium 9 and the third scattering medium 11 is an elliptically columnar shape. The major axis direction of the elliptically columnar shaped scattering medium coincides with the tracking direction. At least one of the shapes of the first scattering medium 9 and the third scattering medium 11 may be a rectangular parallelepiped shape, and the lengthwise direction of the rectangular parallelepiped shaped scattering medium may coincide with the tracking direction.

According to the above configuration, as shown in FIG. 17, the first scattering medium 9 or the third scattering medium 11 for use in detecting a gap interval is disposed to constantly overlap a number of tracks in a vertical direction, even if off-tracking has occurred. In other words, even if the first scattering medium 9 or the third scattering medium 11 is displaced in the tracking direction, the distance between the first scattering medium 9 or the third scattering medium 11, and a particle 107 on the information medium 12 is maintained to be a constant distance d1. Accordingly, as compared with the case in which a scattering medium and a track have a one-to-one correspondence, as shown in FIG. 15, for instance, a change in the distance between the first scattering medium 9 or the third scattering medium 11, and a track due to off-tracking is subjected to averaging, and a change in the resonance state is reduced. Thus, the above configuration is advantageous in stably performing gap control.

Figure 18:
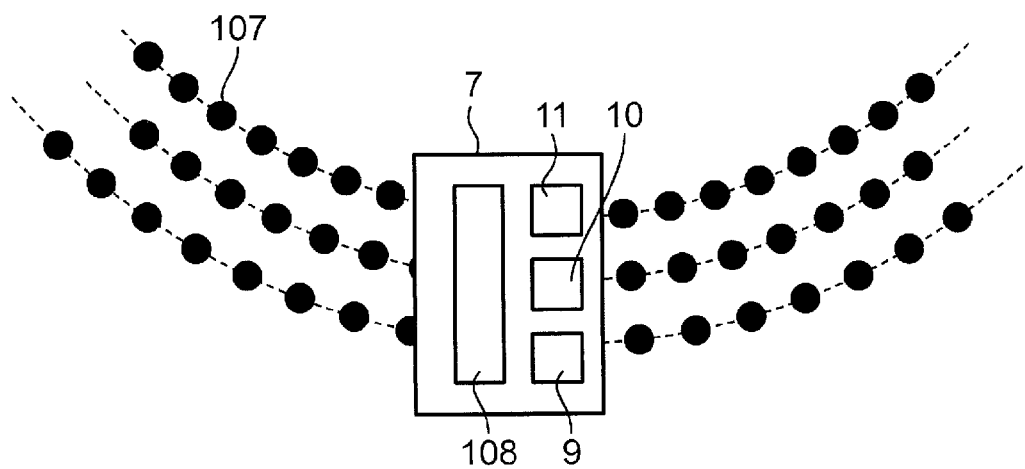
FIG. 18 is a schematic diagram showing a configuration of an optical information device capable of discriminating between a change in the gap interval and off-tracking.

FIG. 18 is a schematic diagram showing a configuration of an optical information device capable of discriminating between a gap interval change and off-tracking.

As shown in FIG. 18, the optical information device may be provided with a fourth scattering medium 108 whose size or shape is designed to interact with the tracks, in addition to the first scattering medium 9, the second scattering medium 10, and the third scattering medium 11, which have a one-to-one correspondence with respect to the tracks.

According to the above configuration, it is possible to discriminate between a change in the gap interval between a scattering medium and the information medium, and off-tracking.

As described above, a change in the resonance state due to off-tracking of a scattering medium whose size or shape is designed to interact with the tracks is reduced. Accordingly, the fourth scattering medium 108 is capable of detecting only a change in the gap interval. Regardless of the above advantage, in the case where a scattering medium and a track have a one-to-one correspondence, off-tracking may be erroneously detected as a change in the gap interval.

However, it is possible to discriminate between a gap interval change and off-tracking by making judgment based on a combination of detection results of the first scattering medium 9, the third scattering medium 11, and the fourth scattering medium 108.

Figure 19:
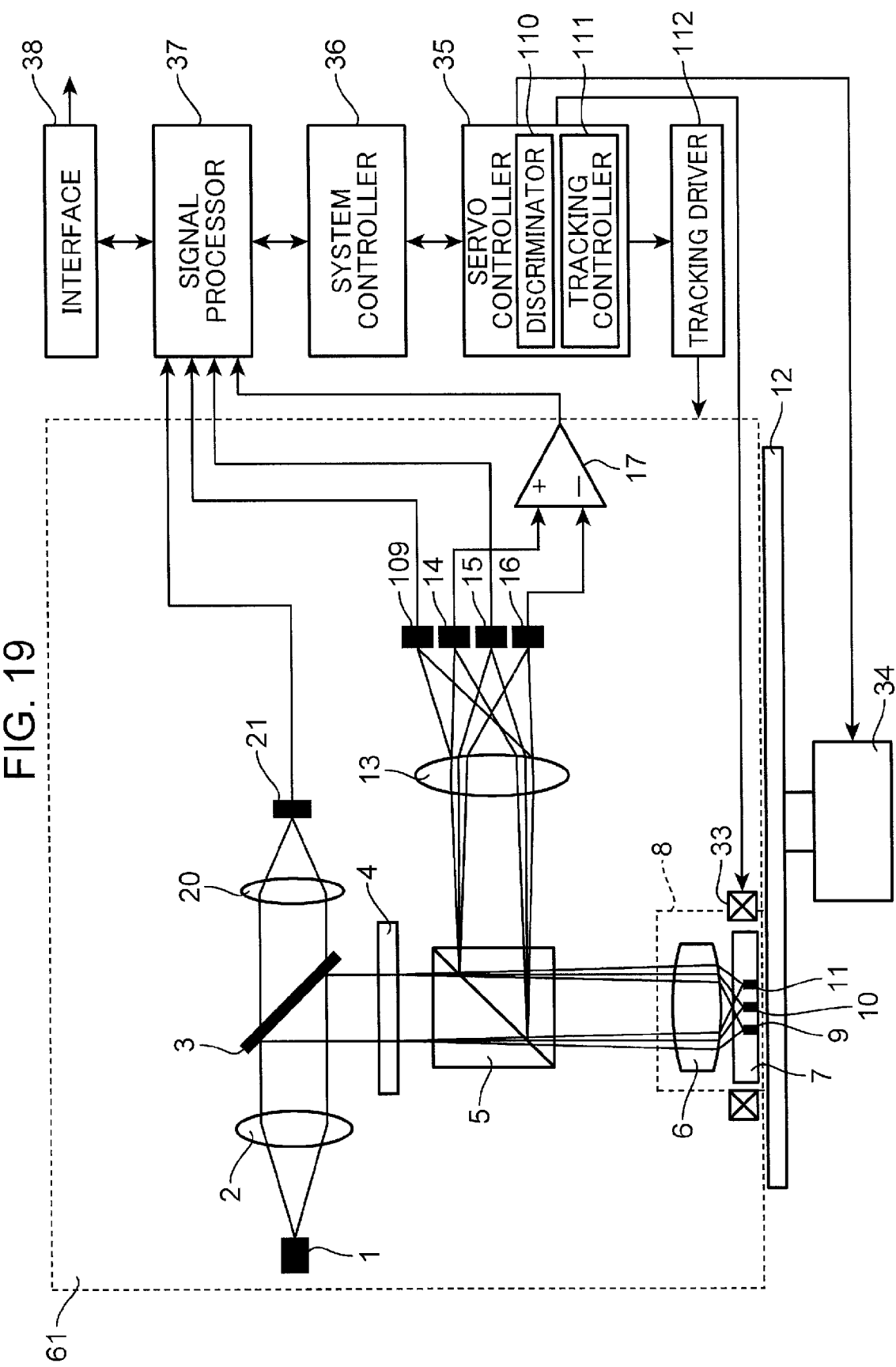
FIG. 19 is a diagram showing a configuration of an optical disc driving device as a modification of the seventh embodiment of the invention.
Figure 20:
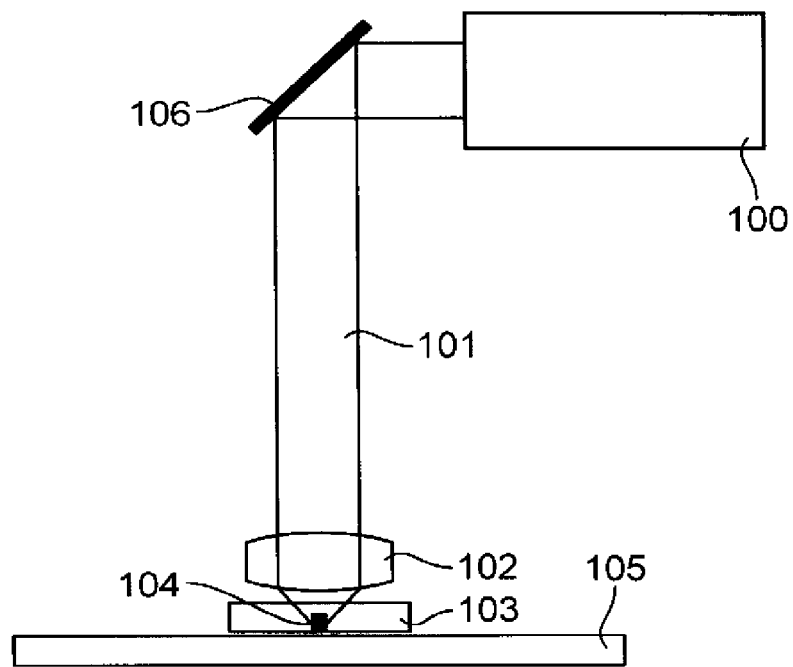
FIG. 20 is a diagram showing a configuration of a conventional optical pickup for use in recording or reproducing information to or from an information medium with use of plasmon.

FIG. 19 is a diagram showing a configuration of an optical disc driving device as a modification of the seventh embodiment of the invention. Constituent elements of the optical disc driving device shown in FIG. 19 substantially the same or equivalent to those shown in FIG. 1 and in FIG. 10 are indicated with the same reference numerals as those shown in FIG. 1 and in FIG. 10, and detailed description thereof is omitted herein.

The optical disc driving device shown in FIG. 19 is provided with an optical information device 61, a spindle motor 34, a signal processor 37, an interface 38, a servo controller 35, an unillustrated feed motor, a system controller 36, and a tracking driver 112.

The optical information device 61 is further provided with a fourth scattering medium 108 (not shown) and a fourth light detecting element 109. The fourth scattering medium 108 is disposed on a substrate 7. The fourth scattering medium 108 is disposed at a position different from the positions of a first scattering medium 9, a second scattering medium 10, and a third scattering medium 11. The fourth scattering medium 108 interacts with particles 107 disposed on at least two tracks out of the tracks.

As shown in FIG. 18, the shapes of the first scattering medium 9, the second scattering medium 10, and the third scattering medium 11 are a quadrangular prismatic shape (rectangular parallelepiped shape) with bottom surfaces thereof having a square shape. The fourth scattering medium 108 has a quadrangular prismatic shape with a bottom surface thereof having a rectangular shape. The lengthwise direction of the fourth scattering medium 108 having a quadrangular prismatic shape coincides with the tracking direction.

A diffraction element 4 splits a light beam from a laser light source 1 into four light beams. An objective lens 6 converges the four light beams split by the diffraction element 4, and guides the converged light beams to the first scattering medium 9, the second scattering medium 10, the third scattering medium 11, and the fourth scattering medium 108.

The fourth light detecting element 109 receives reflected light from the fourth scattering medium 108, and outputs an electrical signal according to the amount of received light.

The servo controller 35 is provided with a discriminator 110 and a tracking controller 111.

The discriminator 110 discriminates whether at least two scattering media are displaced in the tracking direction, based on a change in an amount of reflected light from at least one scattering medium other than the at least two scattering media, which are obtained by irradiating, onto the at least one scattering medium other than the at least two scattering media, at least one light beam out of the light beams, and based on a change in an amount of reflected light from the at least two scattering media.

Specifically, in the case where it is detected that the resonance states of the first scattering medium 9 and the third scattering medium 11 are changed, and the resonance state of the fourth scattering medium 108 is also changed, the discriminator 110 discriminates that the above discrimination result indicates a change in the gap interval. Further, in the case where the resonance states of the first scattering medium 9 and the third scattering medium 11 are changed, but the resonance state of the fourth scattering medium 108 is not changed, the discriminator 110 discriminates that the above discrimination result indicates that off-tracking has occurred.

In the above configuration, the fourth scattering medium 108 may be disposed forwardly in the rotating direction of the information medium 12, or may be disposed rearwardly in the rotating direction of the information medium 12 with respect to the first scattering medium 9, the second scattering medium 10, and the third scattering medium 11. Further, the fourth scattering medium 108 may be disposed linearly with respect to the first scattering medium 9, the second scattering medium 10, and the third scattering medium 11. Furthermore, the fourth scattering medium 108 may be disposed at plural positions, namely, disposed forwardly in the rotating direction of the information medium 12, disposed rearwardly in the rotating direction of the information medium 12, and disposed linearly with respect to the second scattering medium 10 and the third scattering medium 11.

The tracking controller 111 corrects displacement of the at least two scattering media in the tracking direction, in the case where the discriminator 110 discriminates that the at least two scattering media are displaced in the tracking direction.

The tracking driver 112 is constituted of a feed motor, for instance. The tracking driver 112 is controlled by the tracking controller 111 to move the optical information device 61 in the tracking direction for correcting displacement of the at least two scattering media in the tracking direction.

As described above, the discriminator 110 may discriminate whether the first scattering medium 9 and the third scattering medium 11 are displaced in a direction perpendicular to a track, based on a change in an amount of reflected light from the fourth scattering medium 108, which are obtained by irradiating one of the light beams onto the fourth scattering medium 108, and based on a change in an amount of reflected light from the first scattering medium 9 and from the third scattering medium 11.

Specifically, the laser light source 1 irradiates the fourth scattering medium 108 with laser light. When the laser light is irradiated onto the fourth scattering medium 108, for instance, local plasmon is excited on the fourth scattering medium 108, and the optical electric field intensity near the fourth scattering medium 108 is enhanced. In this example, reflected light from the fourth scattering medium 108 is reflected on a beam splitter 5, and is collected on the fourth light detecting element through a detection lens 13. The fourth light detecting element 109 receives the reflected light from the fourth scattering medium 108, and converts the received light into an electrical signal according to the amount of reflected light. The electrical signal from the fourth light detecting element 109 is sent to the signal processor 37. When the above operation is performed, the amount of reflected light from the fourth scattering medium 108 is changed depending on the distance between the fourth scattering medium 108 and the track on the information medium 12.

The discriminator 110 discriminates that a change in the gap interval has occurred, in the case where the amounts of reflected light from the first scattering medium 9 and from the third scattering medium 11 are changed, and a change in an amount of reflected light from the fourth scattering medium 108 is larger than a predetermined value.

Further, the discriminator 110 discriminates that displacement (namely, off-tracking) in a direction perpendicular to the track has occurred, in the case where the amounts of reflected light from the first scattering medium 9 and from the third scattering medium 11 are changed, but the change in the amount of reflected light from the fourth scattering medium 108 is equal to or smaller than the predetermined value.

The aforementioned predetermined value may be set to a maximum value among the change amounts of reflected light from the fourth scattering medium 108, in the case where the fourth scattering medium 108 is displaced in a direction perpendicular to the track.

Further, the tracking controller 111 may drive the optical information device 61 in a direction perpendicular to a track in such a manner as to correct displacement of the first scattering medium 9 and the third scattering medium 11 in the direction perpendicular to the track, in the case where the discriminator 110 discriminates that the first scattering medium 9 and the third scattering medium 11 are displaced in the direction perpendicular to the track.

According to the above configuration, it is possible to reduce an influence resulting from detection variation of a gap interval due to off-tracking. This is more advantageous in stably performing gap control.

In this embodiment, the discriminator 110 corresponds to an example of a discriminating section, and the tracking controller 111 corresponds to an example of a tracking control section.

Further, in the optical information devices according to the first to seventh embodiments, there may be provided two scattering media for use in detecting a gap interval. In the above configuration, the amount of reflected light from one of the two scattering media may be minimized at the first gap interval, and the amount of reflected light from the other of the two scattering media may be minimized at the second gap interval larger than the first gap interval.

In the above configuration, reflected light from the two scattering media is received by two light receiving elements different from each other. The two light receiving elements respectively convert electrical signals in proportion to the amounts of incident light, and output the conversion results to a detecting section. The detecting section detects a gap interval, based on a signal in proportion to a difference in the electrical signals respectively output from the two light receiving elements. In the above configuration, the third gap interval, which is a gap interval between the at least one scattering medium for use in recording or reproducing information, and the information medium, and which is optimum for recording or reproducing information, may be not smaller than the first gap interval but not larger than the second gap interval.

According to the above configuration, it is possible to more precisely control the gap interval between the at least one scattering medium for use in recording or reproducing information and the information medium, to a gap interval optimum for recording or reproducing information.

Further, the information medium 12 may be further provided with a protective layer on a surface thereof corresponding to the irradiation side of plasmon light with respect to the recording layer. Alternatively, the information medium 12 may be further provided with a protective layer on a surface thereof corresponding to the irradiation side of plasmon light with respect to the particles 107. Further, the material composing the protective layer may be filled between the particles 107. An example of the material for the protective layer may be a dielectric material, or a material containing metal. Alternatively, the protective layer may contain a material including $ZrSiO_4$, $(ZrO_2)_{25}(Cr_2O_3)_{50}$, SiCr, $TiO_2$, $ZrO_2$, $HfO_2$, ZnO, $Nb_2O_5$, $Ta_2O_5$, $SiO_2$, $SnO_2$, $Al_2O_3$, $Bi_2O_3$, $Cr_2O_3$, $Ga_2O_3$, $In_2O_3$, $Sc_2O_3$, $Y_2O_3$, $La_2O_3$, $Gd_2O_3$, $Dy_2O_3$, $Yb_2O_3$, CaO, MgO, $CeO_2$, $TeO_2$, C—N, Ti—N, Zr—N, Nb—N, Ta—N, Si—N, Ge—N, Cr—N, Al—N, Ge—Si—N, Ge—Cr—N, ZnS, SiC, $LaF_3$, $CeF_3$, $MgF_2$, or C.

The foregoing embodiments mainly include the invention having the following configurations.

An optical information device according to an aspect of the invention is provided with a plurality of scattering media; a light beam generating section which generates a plurality of light beams; a light guiding section which guides, to at least two scattering media out of the plurality of the scattering media, at least two light beams out of the plurality of the light beams; and a detecting section which detects a gap interval between the at least two scattering media and an information medium, based on a change in an amount of reflected light from the at least two scattering media.

According to the above configuration, the light beam generating section generates a plurality of light beams. The light guiding section guides, to at least two scattering media out of a plurality of the scattering media, at least two light beams out of the plurality of the light beams. The detecting section detects a gap interval between the at least two scattering media and an information medium, based on a change in an amount of reflected light from the at least two scattering media.

In the above configuration, a gap interval between the at least two scattering media and the information medium is detected, based on a change in an amount of reflected light from the at least two scattering media. Accordingly, it is possible to detect a gap interval between a scattering medium and the information medium with high precision. This is advantageous in stably recording or reproducing information to or from the information medium with high precision.

Further, in the optical information device, preferably, the amounts of reflected light from the at least two scattering media may be minimized at the gap interval different from each other.

Accordingly to the above configuration, it is possible to detect a gap interval between a scattering medium and the information medium with extremely high precision, based on a difference between the amounts of reflected light from the at least two scattering media.

Further, in the optical information device, preferably, the light guiding section may guide, to two scattering media out of the plurality of the scattering media, two light beams out of the plurality of the light beams. The optical information device may be further provided with two light receiving elements which respectively receive reflected light from the two scattering media, and respectively output electrical signals in proportion to amounts of the received light. The detecting section may detect the gap interval, based on a difference between the electrical signals respectively output from the two light receiving elements.

According to the above configuration, the light guiding section guides, to two scattering media out of the plurality of the scattering media, two light beams out of the plurality of the light beams. The two light receiving elements respectively receive the reflected light from the two scattering media, and respectively output the electrical signals in proportion to the amounts of the received light. The detecting section detects the gap interval, based on the difference between the electrical signals respectively output from the two light receiving elements.

In the above configuration, it is easy to detect a gap interval between a scattering medium and the information medium with extremely high precision, based on a difference between the electrical signals respectively output from the two light receiving elements.

Further, in the optical information device, preferably, the light guiding section may guide, to at least one scattering medium other than the at least two scattering media out of the plurality of the scattering media, at least one light beam other than the at least two light beams out of the plurality of the light beams. Information may be recorded on the information medium or information may be reproduced from the information medium with use of an optical electric field generated on the at least one scattering medium.

According to the above configuration, the light guiding section guides, to at least one scattering medium other than the at least two scattering media out of the plurality of the scattering media, at least one light beam other than the at least two light beams out of the plurality of the light beams. Information is recorded on the information medium or information is reproduced from the information medium with use of an optical electric field generated on the at least one scattering medium.

In the above configuration, it is possible to record information on the information medium with use of an optical electric field generated on the at least one scattering medium other than the at least two scattering media for use in detecting a gap interval. Further, it is possible to reproduce information from the information medium with use of an optical electric field generated on the at least one scattering medium other than the at least two scattering media for use in detecting a gap interval.

Further, in the optical information device, preferably, the plurality of the scattering media may generate plasmon light by irradiating the plurality of the light beams thereto.

According to the above configuration, plasmon light is generated by irradiating the plurality of light beams onto the plurality of the scattering media. Accordingly, it is possible to form a light spot of a size equal to or smaller than the diffraction limit with use of the plasmon light. This is advantageous in recording information on the information medium with a high density.

Further, in the optical information device, preferably, the at least two scattering media may be disposed to be adjacent to the at least one scattering medium.

According to the above configuration, at least two scattering media are disposed to be adjacent to at least one scattering medium. In the above configuration, it is possible to dispose a plurality of scattering media in the optical information device with a simplified configuration. This is advantageous in miniaturizing the optical information device.

Further, in the optical information device, preferably, the light guiding section may guide, to two scattering media out of the plurality of the scattering media, two light beams out of the plurality of the light beams. The amounts of reflected light from the two scattering media may be minimized at two gap intervals different from each other. The optical information device may be further provided with two light receiving elements which respectively receive reflected light from the two scattering media, and respectively output electrical signals in proportion to amounts of the received light. The detecting section may detect the gap interval, based on a difference between the electrical signals respectively output from the two light receiving elements. An amount of reflected light from the at least one scattering medium may be minimized at the two gap intervals at which the difference is minimized.

According to the above configuration, the light guiding section guides, to two scattering media out of the plurality of the scattering media, two light beams out of the plurality of the light beams. The amounts of reflected light from the two scattering media are minimized at two gap intervals different from each other. The two light receiving elements respectively receive reflected light from the two scattering media, and respectively output electrical signals in proportion to the amounts of the received light. The detecting section detects the gap interval, based on the difference between the electrical signals respectively output from the two light receiving elements. The amount of reflected light from the at least one scattering medium is minimized at the two gap intervals at which the difference is minimized.

In the above configuration, it is possible to determine a gap interval optimum for recording or reproducing information by detecting the two gap intervals at which the difference between the electrical signals respectively output from the two light receiving elements is minimized.

Further, in the optical information device, preferably, the light guiding section may guide, to two scattering media out of the plurality of the scattering media, two light beams out of the plurality of the light beams. The amount of reflected light from one of the two scattering media may be minimized at a first gap interval. The amount of reflected light from the other of the two scattering media may be minimized at a second gap interval larger than the first gap interval. The optical information device may be further provided with two light receiving elements which respectively receive reflected light from the two scattering media, and respectively output electrical signals in proportion to amounts of the received light. The detecting section may detect the gap interval, based on a difference between the electrical signals respectively output from the two light receiving elements. A third gap interval as a gap interval between the at least one scattering medium and the information medium in recording or reproducing information may be not smaller than the first gap interval but not larger than the second gap interval.

According to the above configuration, the light guiding section guides, to two scattering media out of the plurality of the scattering media, two light beams out of the plurality of the light beams. The amount of reflected light from the one of the two scattering media is minimized at the first gap interval. The amount of reflected light from the other of the two scattering media is minimized at the second gap interval larger than the first gap interval. The two light receiving elements respectively receive reflected light from the two scattering media, and respectively output electrical signals in proportion to the amounts of the received light. The detecting section detects the gap interval, based on the difference between the electrical signals respectively output from the two light receiving elements. The third gap interval as the gap interval between the at least one scattering medium and the information medium in recording or reproducing information is not smaller than the first gap interval but not larger than the second gap interval.

In the above configuration, it is possible to control the gap interval between the at least one scattering medium for use in recording or reproducing information and the information medium, to a gap interval optimum for recording or reproducing information, with enhanced precision.

Further, in the optical information device, preferably, shapes of the plurality of the scattering media may be different from each other.

According to the above configuration, the shapes of the plurality of the scattering media are different from each other. In the above configuration, it is possible to detect a gap interval with a high sensitivity and in a wide range with a simplified configuration.

Further, in the optical information device, preferably, the light beam generating section may include a light source which emits a light beam, and an optical element which splits the light beam from the light source into a plurality of light beams. The light guiding section may include an objective lens which converges the plurality of the light beams split by the optical element.

According to the above configuration, a light beam from the light source is split into a plurality of light beams, and the split light beams are converged. In the above configuration, it is possible to guide the plurality of the light beams to the plurality of the scattering media.

Further, in the optical information device, preferably, the plurality of the scattering media may be formed on a surface of a flat portion of a flat substrate or may be embedded in the flat substrate, the flat portion being formed on a surface of the flat substrate facing an incident surface of the information medium.

According to the above configuration, the plurality of the scattering media are formed on a surface of a flat portion of a flat substrate or are embedded in the flat substrate, the flat portion being formed on a surface of the flat substrate facing an incident surface of the information medium. In the above configuration, it is easy to dispose the plurality of the scattering media in the optical information device, and it is possible to prevent peel-off or damage of the scattering media in contact thereof with the information medium, and to avoid obstruction thereof with the information medium while moving on the information medium.

Further, in the optical information device, preferably, a shape of the objective lens may be a hemispherical shape or a super hemispherical shape. The objective lens may have a flat portion on a surface thereof facing an incident surface of the information medium. The plurality of the scattering media may be formed on a surface of the flat portion or may be embedded in the objective lens.

According to the above configuration, the shape of the objective lens is a hemispherical shape or a super hemispherical shape. The objective lens has a flat portion on a surface thereof facing an incident surface of the information medium. The plurality of the scattering media are formed on a surface of the flat portion or are embedded in the objective lens.

In the above configuration, the plurality of the scattering media are integrally formed on the objective lens. Accordingly, it is easy to dispose the plurality of the scattering media. This is advantageous in simplifying the configuration of the optical information device and in reducing the manufacturing cost of the optical information device.

Further, in the optical information device, preferably, the objective lens may include at least two or more lenses. A lens facing the information medium out of the at least two or more lenses may be a solid immersion lens having a hemispherical shape or a super hemispherical shape. The solid immersion lens may have a flat portion on a surface thereof facing an incident surface of the information medium. The plurality of the scattering media may be formed on a surface of the flat portion or may be embedded in the solid immersion lens.

According to the above configuration, the objective lens includes at least two or more lenses. A lens facing the information medium out of the at least two or more lenses is a solid immersion lens having a hemispherical shape or a super hemispherical shape. The solid immersion lens has a flat portion on a surface thereof facing an incident surface of the information medium. The plurality of the scattering media are formed on a surface of the flat portion or are embedded in the solid immersion lens.

Use of a solid immersion lens makes it possible to enhance the energy density of light converged on the plurality of the scattering media. Thus, the above configuration is advantageous in improving the light use efficiency. Further, according to the above configuration, the plurality of the scattering media are integrally formed on the solid immersion lens. In the above configuration, it is easy to dispose the plurality of the scattering media. This is advantageous in simplifying the configuration of the optical information device and in suppressing the manufacturing cost of the optical information device.

Further, in the optical information device, preferably, the light beam generating section may include a light source which emits a light beam. The light guiding section may include an optical waveguide which guides the light beam from the light source, and a tapered waveguide which converges the light beam propagating through the optical waveguide. Information may be recorded on the information medium or information may be reproduced from the information medium with use of an optical electric field generated on at least one scattering medium other than the at least two scattering media out of the plurality of the scattering media.

According to the above configuration, the light source emits a light beam. The optical waveguide guides the light beam from the light source. The tapered waveguide converges the light beam propagating through the optical waveguide. Information is recorded on the information medium or information is reproduced from the information medium with use of an optical electric field generated on the at least one scattering medium other than the at least two scattering media out of the plurality of the scattering media.

In the above configuration, it is possible to integrate the light source, the optical waveguide, and the tapered waveguide on a substrate. This is advantageous in enhancing the stability of the optical performance of the optical information device. Further, in the above configuration, it is possible to omit a step of adjusting or adhering optical elements in the optical information device. Thus, the above configuration is advantageous in reducing the manufacturing cost of the optical information device.

Further, in the optical information device, preferably, the light beam generating section may include a plurality of light sources which emit a light beam. The light guiding section may guide, to at least one scattering medium other than the at least two scattering media out of the plurality of the scattering media, a light beam from at least one light source out of the plurality of the light sources. Information may be recorded on the information medium or information may be reproduced from the information medium with use of an optical electric field generated on the at least one scattering medium. The light guiding section may guide, to the at least two scattering media, a light beam from at least one light source other than the at least one light source out of the plurality of the light sources. The detecting section may detect a gap interval between the at least two scattering media and the information medium, based on a change in an amount of reflected light from the at least two scattering media.

According to the above configuration, the light beam generating section includes a plurality of light sources which emit a light beam. The light guiding section guide, to at least one scattering medium other than the at least two scattering media out of the plurality of the scattering media, a light beam from at least one light source out of the plurality of the light sources. Information is recorded on the information medium or information is reproduced from the information medium with use of an optical electric field generated on the at least one scattering medium. The light guiding section guides, to the at least two scattering media, a light beam from at least one light source other than the at least one light source out of the plurality of the light sources. The detecting section detects a gap interval between the at least two scattering media and the information medium, based on a change in an amount of reflected light from the at least two scattering media.

In the above configuration, a light beam for recording or reproducing information, and a light beam for detecting a gap interval are separated. Accordingly, it is possible to reduce mutual interference between a signal for recording or reproducing information, and a signal for detecting a gap interval. This is advantageous in reducing noise which may be included in a reproduction signal.

Further, in the optical information device, preferably, a plurality of tracks may be formed on the information medium. Amounts of reflected light from the at least two scattering media may be changed depending on a distance between each of the scattering media and the corresponding track. At least one of the at least two scattering media may interact with at least two tracks out of the plurality of the tracks.

According to the above configuration, at least one of the at least two scattering media interacts with at least two tracks out of the plurality of the tracks. In the above configuration, it is possible to accurately detect a gap interval, even if the at least two scattering media are displaced in the tracking direction.

Further, in the optical information device, preferably, a plurality of tracks may be formed on the information medium. Amounts of reflected light from the at least two scattering media may be changed depending on a distance between each of the scattering media and the corresponding track. At least one scattering medium other than the at least two scattering media out of the plurality of the scattering media may interact with particles on at least two tracks out of the plurality of the tracks. The optical information device may be further provided with a discriminating section which discriminates whether the at least two scattering media are displaced in the tracking direction, based on a change in an amount of reflected light from the at least one scattering medium, which are obtained by irradiating at least one light beam out of the plurality of light beams onto the at least one scattering medium, and based on a change in an amount of reflected light from the at least two scattering media.

According to the above configuration, a plurality of tracks are formed on the information medium. Amounts of reflected light from the at least two scattering media are changed depending on a distance between each of the scattering media and the corresponding track. At least one scattering medium other than the at least two scattering media out of the plurality of the scattering media interacts with particles on at least two tracks out of the plurality of the tracks. The discriminating section discriminates whether the at least two scattering media are displaced in the tracking direction, based on a change in an amount of reflected light from the at least one scattering medium, which are obtained by irradiating at least one light beam out of the plurality of light beams onto the at least one scattering medium, and based on a change in an amount of reflected light from the at least two scattering media.

In the above configuration, it is discriminated whether the at least two scattering media are displaced in the tracking direction. This is advantageous in securely detecting that the at least two scattering media are displaced in the tracking direction.

Further, preferably, the optical information device may be further provided with a tracking control section which corrects displacement of the at least two scattering media in the tracking direction, in a case where the discriminating section discriminates that the at least two scattering media are displaced in the tracking direction.

According to the above configuration, the tracking control section corrects displacement of the at least two scattering media in the tracking direction, in a case where the discriminating section discriminates that the at least two scattering media are displaced in the tracking direction.

In the above configuration, it is possible to reduce an influence resulting from detection variation of a gap interval due to displacement of the at least two scattering media in the tracking direction. This is more advantageous in stably performing gap control.

Further, in the optical information device, preferably, a plurality of tracks may be formed on the information medium. Amounts of reflected light from the at least two scattering media may be changed depending on a distance between each of the scattering media and the corresponding track. The optical information device may be further provided with a gap interval storing section which stores a plurality of gap intervals detected a plurality of times by the detecting section during a predetermined period of time when the optical information devices scans on the information medium, and a gap average calculating section which calculates an average value of the plurality of the gap intervals stored in the gap interval storing section.

According to the above configuration, a plurality of tracks are formed on the information medium. Amounts of reflected light from the at least two scattering media are changed depending on a distance between each of the scattering media and the corresponding track. The gap interval storing section stores a plurality of gap intervals detected a plurality of times by the detecting section during a predetermined period of time when the optical information devices scans on the information medium. The gap average calculating section calculates an average value of the plurality of the gap intervals stored in the gap interval storing section.

In the above configuration, it is possible to reduce an influence resulting from detection variation of a gap interval due to temporary displacement of the at least two scattering media in the tracking direction. This is advantageous in stably performing gap control.

An optical disc driving device according to another aspect of the invention is provided with the optical information device having any one of the aforementioned configurations; a motor which rotates the information medium; and a control section which controls the motor and the optical information device, based on an electrical signal to be obtained from the optical information device. According to the above configuration, it is possible to incorporate the aforementioned optical information device in an optical disc driving device.

Further, preferably, the optical disc driving device may be further provided with a swing arm which moves the optical information device relative to the information medium, wherein the motor rotates the information medium, and lifts the optical information device above the information medium by a predetermined distance, using a rotational force of the information medium.

According to above configuration, it is possible to roughly adjust a gap interval between the optical information device and the information medium by lifting the optical information device above the information medium by a predetermined distance, using a rotational force of the information medium, and to finely adjust the gap interval, based on gap interval information to be obtained from reflected light from the scattering media.

An optical information recording device according to yet another aspect of the invention is provided with the aforementioned optical disc driving device, and a recording information processing section which processes information to be recorded on the information medium by the optical disc driving device. According to the above configuration, it is possible to incorporate an optical disc driving device provided with the aforementioned optical information device in an optical information recording device.

An optical information reproducing device according to yet another aspect of the invention is provided with the aforementioned optical disc driving device, and a reproduction information processing section which processes information reproduced from the information medium by the optical disc driving device. According to the above configuration, it is possible to incorporate an optical disc driving device provided with the aforementioned optical information device in an optical information reproducing device.

A gap control method according to yet another aspect of the invention is a gap control method for controlling a gap interval between a plurality of scattering media provided in an optical information device, and an information recording medium. The method includes an irradiating step of irradiating at least two light beams out of the plurality of the light beams onto at least two scattering media out of the plurality of the scattering media; and a detecting step of detecting a gap interval between the at least two scattering media and the information medium, based on a change in an amount of reflected light from the at least two scattering media.

According to the above configuration, in the irradiating step, at least two light beams out of the plurality of the light beams are irradiated onto at least two scattering media out of the plurality of the scattering media. In the detecting step, a gap interval between the at least two scattering media and the information medium is detected, based on a change in an amount of reflected light from the at least two scattering media.

In the above configuration, a gap interval between the at least two scattering media and the information medium is detected, based on a change in an amount of reflected light from the at least two scattering media. Accordingly, it is possible to detect a gap interval between a scattering medium and the information medium with high precision. This is advantageous in stably recording or reproducing information to or from the information medium with high precision.

An optical pickup according to still another aspect of the invention is provided with a plurality of scattering media; a light beam generating section which generates a plurality of light beams; a light guiding section which guides, to at least two scattering media out of the plurality of the scattering media, at least two light beams out of the plurality of the light beams; and a light receiving element which receives reflected light from the at least two scattering media, and outputs a change in an amount of the received light, wherein the amount of the reflected light from the at least two scattering media is minimized at the gap interval different from each other.

According to the above configuration, the light beam generating section generates a plurality of light beams. The light guiding section guides, to at least two scattering media out of the plurality of the scattering media, at least two light beams out of the plurality of the light beams. The light receiving element receives reflected light from the at least two scattering media, and outputs a change in an amount of the received light. The amounts of reflected light from the at least two scattering media are minimized at the gap interval different from each other.

In the above configuration, a gap interval between the at least two scattering media and the information medium is detected, based on a change in an amount of the received light from the at least two scattering media. Accordingly, it is possible to detect a gap interval between a scattering medium and the information medium with high precision. This is advantageous in stably recording or reproducing information to or from an information medium with high precision.

The embodiments or the examples described in the detailed description of the invention are provided to clarify the technical contents of the invention. The invention should not be construed to be limited to the embodiments or the examples. The invention may be modified in various ways as far as such modifications do not depart from the spirit and the scope of the invention hereinafter defined.

INDUSTRIAL APPLICABILITY

The optical information device, the optical disc driving device, the optical information recording device, the optical information reproducing device, the gap control method, and the optical pickup of the invention are capable of detecting a gap interval between a scattering medium on which plasmon light is generated, and an information medium in the order of nanometers or in the order of sub-nanometers with high precision for stable control, and accordingly, are useful as an optical information device, an optical disc driving device, an optical information recording device, an optical information reproducing device, a gap control method, and an optical pickup configured to record or reproduce information to or from an information medium with use of plasmon light.

The invention claimed is:

1. An optical information device, comprising:
a plurality of scattering media;
a light beam generating section which generates a plurality of light beams;
a light guiding section which guides, to at least two scattering media out of the plurality of the scattering media, at least two light beams out of the plurality of the light beams; and
a detecting section which detects a gap interval between the at least two scattering media and an information medium, based on a change in an amount of reflected light from the at least two scattering media.

2. The optical information device according to claim 1, wherein
the amounts of reflected light from the at least two scattering media are minimized at the gap interval different from each other.

3. The optical information device according to claim 1, wherein
the light guiding section guides, to two scattering media out of the plurality of the scattering media, two light beams out of the plurality of the light beams,
the optical information device further comprises two light receiving elements which respectively receive reflected light from the two scattering media, and respectively output electrical signals in proportion to amounts of the received light, and
the detecting section detects the gap interval, based on a difference between the electrical signals respectively output from the two light receiving elements.

4. The optical information device according to claim 1, wherein
the light guiding section guides, to at least one scattering medium other than the at least two scattering media out of the plurality of the scattering media, at least one light beam other than the at least two light beams out of the plurality of the light beams, and
information is recorded on the information medium or information is reproduced from the information medium with use of an optical electric field generated on the at least one scattering medium.

5. The optical information device according to claim 1, wherein
the plurality of the scattering media generate plasmon light by irradiating the plurality of the light beams thereto.

6. The optical information device according to claim 4, wherein
the at least two scattering media are disposed to be adjacent to the at least one scattering medium.

7. The optical information device according to claim 4, wherein
the light guiding section guides, to two scattering media out of the plurality of the scattering media, two light beams out of the plurality of the light beams,
the amounts of reflected light from the two scattering media are minimized at two gap intervals different from each other,
the optical information device further comprises two light receiving elements which respectively receive reflected light from the two scattering media, and respectively output electrical signals in proportion to amounts of the received light,
the detecting section detects the gap interval, based on a difference between the electrical signals respectively output from the two light receiving elements, and
an amount of reflected light from the at least one scattering medium is minimized at the two gap intervals at which the difference is minimized.

8. The optical information device according to claim 4, wherein
the light guiding section guides, to two scattering media out of the plurality of the scattering media, two light beams out of the plurality of the light beams,
the amount of reflected light from one of the two scattering media is minimized at a first gap interval,
the amount of reflected light from the other of the two scattering media is minimized at a second gap interval larger than the first gap interval,
the optical information device further comprises two light receiving elements which respectively receive reflected light from the two scattering media, and respectively output electrical signals in proportion to amounts of the received light,
the detecting section detects the gap interval, based on a difference between the electrical signals respectively output from the two light receiving elements, and
a third gap interval as a gap interval between the at least one scattering medium and the information medium in recording or reproducing information is not smaller than the first gap interval but not larger than the second gap interval.

9. The optical information device according to claim 1, wherein
shapes of the plurality of the scattering media are different from each other.

10. The optical information device according to claim 1, wherein
the light beam generating section includes
a light source which emits a light beam, and
an optical element which splits the light beam from the light source into a plurality of light beams, and
the light guiding section includes an objective lens which converges the plurality of the light beams split by the optical element.

11. The optical information device according to claim 1, wherein
the plurality of the scattering media are formed on a surface of a flat portion of a flat substrate or are embedded in the flat substrate, the flat portion being formed on a surface of the flat substrate facing an incident surface of the information medium.

12. The optical information device according to claim 10, wherein
a shape of the objective lens is a hemispherical shape or a super hemispherical shape,
the objective lens has a flat portion on a surface thereof facing an incident surface of the information medium, and
the plurality of the scattering media are formed on a surface of the flat portion or are embedded in the objective lens.

13. The optical information device according to claim 10, wherein
the objective lens includes at least two or more lenses,
a lens facing the information medium out of the at least two or more lenses is a solid immersion lens having a hemispherical shape or a super hemispherical shape,
the solid immersion lens has a flat portion on a surface thereof facing an incident surface of the information medium, and
the plurality of the scattering media are formed on a surface of the flat portion or are embedded in the solid immersion lens.

14. The optical information device according to claim 1, wherein
  the light beam generating section includes a light source which emits a light beam,
  the light guiding section includes
    an optical waveguide which guides the light beam from the light source, and
    a tapered waveguide which converges the light beam propagating through the optical waveguide, and
  information is recorded on the information medium or information is reproduced from the information medium with use of an optical electric field generated on at least one scattering medium other than the at least two scattering media out of the plurality of the scattering media.

15. The optical information device according to claim 1, wherein
  the light beam generating section includes a plurality of light sources which emit a light beam,
  the light guiding section guides, to at least one scattering medium other than the at least two scattering media out of the plurality of the scattering media, a light beam from at least one light source out of the plurality of the light sources,
  information is recorded on the information medium or information is reproduced from the information medium with use of an optical electric field generated on the at least one scattering medium,
  the light guiding section guides, to the at least two scattering media, a light beam from at least one light source other than the at least one light source out of the plurality of the light sources, and
  the detecting section detects a gap interval between the at least two scattering media and the information medium, based on a change in an amount of reflected light from the at least two scattering media.

16. The optical information device according to claim 1, wherein
  a plurality of tracks are formed on the information medium,
  amounts of reflected light from the at least two scattering media are changed depending on a distance between each of the scattering media and the corresponding track, and
  at least one of the at least two scattering media interacts with at least two tracks out of the plurality of the tracks.

17. The optical information device according to claim 1, wherein
  a plurality of tracks are formed on the information medium,
  amounts of reflected light from the at least two scattering media are changed depending on a distance between each of the scattering media and the corresponding track,
  at least one scattering medium other than the at least two scattering media out of the plurality of the scattering media interacts with particles on at least two tracks out of the plurality of the tracks, and
  the optical information device further comprises a discriminating section which discriminates whether the at least two scattering media are displaced in the tracking direction, based on a change in an amount of reflected light from the at least one scattering medium, which are obtained by irradiating at least one light beam out of the plurality of light beams onto the at least one scattering medium, and based on a change in an amount of reflected light from the at least two scattering media.

18. The optical information device according to claim 17, further comprising
  a tracking control section which corrects displacement of the at least two scattering media in the tracking direction, in a case where the discriminating section discriminates that the at least two scattering media are displaced in the tracking direction.

19. The optical information device according to claim 1, wherein
  a plurality of tracks are formed on the information medium,
  amounts of reflected light from the at least two scattering media are changed depending on a distance between each of the scattering media and the corresponding track,
  the optical information device further comprises
    a gap interval storing section which stores a plurality of gap intervals detected a plurality of times by the detecting section during a predetermined period of time when the optical information devices scans on the information medium, and
    a gap average calculating section which calculates an average value of the plurality of the gap intervals stored in the gap interval storing section.

20. An optical disc driving device, comprising:
  the optical information device of claim 1;
  a motor which rotates the information medium; and
  a control section which controls the motor and the optical information device, based on an electrical signal to be obtained from the optical information device.

21. The optical disc driving device according to claim 20, further comprising
  a swing arm which moves the optical information device relative to the information medium, wherein
  the motor rotates the information medium, and lifts the optical information device above the information medium by a predetermined distance, using a rotational force of the information medium.

22. An optical information recording device, comprising:
  the optical disc driving device of claim 20; and
  a recording information processing section which processes information to be recorded on the information medium by the optical disc driving device.

23. An optical information reproducing device, comprising:
  the optical disc driving device of claim 21, and
  a reproduction information processing section which processes information reproduced from the information medium by the optical disc driving device.

24. A gap control method for controlling a gap interval between a plurality of scattering media provided in an optical information device, and an information recording medium, comprising:
  an irradiating step of irradiating at least two light beams out of the plurality of the light beams onto at least two scattering media out of the plurality of the scattering media; and
  a detecting step of detecting a gap interval between the at least two scattering media and the information medium, based on a change in an amount of reflected light from the at least two scattering media.

25. An optical pickup, comprising:
  a plurality of scattering media;
  a light beam generating section which generates a plurality of light beams;

- a light guiding section which guides, to at least two scattering media out of the plurality of the scattering media, at least two light beams out of the plurality of the light beams; and
- a light receiving element which receives reflected light from the at least two scattering media, and outputs a change in an amount of the received light, wherein the amount of the reflected light from the at least two scattering media is minimized at the gap interval different from each other.

* * * * *